United States Patent
Kobayashi et al.

(10) Patent No.: US 11,189,053 B2
(45) Date of Patent: Nov. 30, 2021

(54) INFORMATION PROCESSING APPARATUS, METHOD OF CONTROLLING INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Toshihiro Kobayashi, Tokyo (JP); Tatsuya Suzuki, Tokyo (JP); Masakazu Fujiki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 16/420,856

(22) Filed: May 23, 2019

(65) Prior Publication Data
US 2019/0371001 A1 Dec. 5, 2019

(30) Foreign Application Priority Data
Jun. 4, 2018 (JP) .............................. JP2018-107154

(51) Int. Cl.
*G06T 7/73* (2017.01)
*G06T 7/13* (2017.01)
(Continued)

(52) U.S. Cl.
CPC .................. *G06T 7/75* (2017.01); *G06T 7/13* (2017.01); *G06T 7/174* (2017.01); *G06T 7/55* (2017.01); *G06T 2207/20224* (2013.01)

(58) Field of Classification Search
CPC .... G06T 7/75; G06T 7/55; G06T 7/13; G06T 7/174; G06T 2207/20224
See application file for complete search history.

(56) References Cited

U.S. PATENT DOCUMENTS 5,129,051 A * 7/1992 Cain ....................... G06T 17/20
345/423
9,557,167 B2 1/2017 Kobayashi et al.
(Continued)

FOREIGN PATENT DOCUMENTS

JP 4649559 B 3/2011

OTHER PUBLICATIONS

S. Hinterstoisser et al., "Gradient Response Maps for Real-Time Detection of Texture-Less Objects," TPAMI, Jan. 2012.

*Primary Examiner* — Kevin Ky
(74) *Attorney, Agent, or Firm* — Carter, DeLuca & Farrell LLP

(57) ABSTRACT

An information processing apparatus comprises an extraction unit configured to extract, as an image edge group, a plurality of image edges in the vicinity, which are detected from a captured image obtained by capturing a target object; a determination unit configured to determine a positional relationship between the image edges included in the image edge group; a holding unit configured to hold a positional relationship between model edges that constitute a three-dimensional model of the target object; a selection unit configured to select a combination of an image edge and a model edge, which correspond to each other, based on matching between the positional relationship of the image edges and the positional relationship of the model edges; and an collation unit configured to estimate a position/orientation of the target object based on the combination.

18 Claims, 14 Drawing Sheets

(51) Int. Cl.
*G06T 7/55* (2017.01)
*G06T 7/174* (2017.01)

(56) References Cited

U.S. PATENT DOCUMENTS

| | | | |
|---|---|---|---|
| 9,621,793 | B2 | 4/2017 | Furihata et al. |
| 9,714,826 | B2 | 7/2017 | Higo et al. |
| 10,059,002 | B2 | 8/2018 | Miyatani et al. |
| 10,171,730 | B2 | 1/2019 | Kobayashi et al. |
| 10,240,913 | B2 | 3/2019 | Kobayashi |
| 10,281,264 | B2 | 5/2019 | Higo et al. |
| 10,430,994 | B1* | 10/2019 | Baker ................ G06T 7/593 |
| 2015/0310663 | A1 | 10/2015 | Yamasaki et al. |
| 2016/0332299 | A1* | 11/2016 | Suzuki ............ G06K 9/00664 |
| 2017/0372466 | A1 | 12/2017 | Hirota et al. |
| 2019/0122027 | A1* | 4/2019 | Prideaux-Ghee ....... G06T 7/246 |

\* cited by examiner

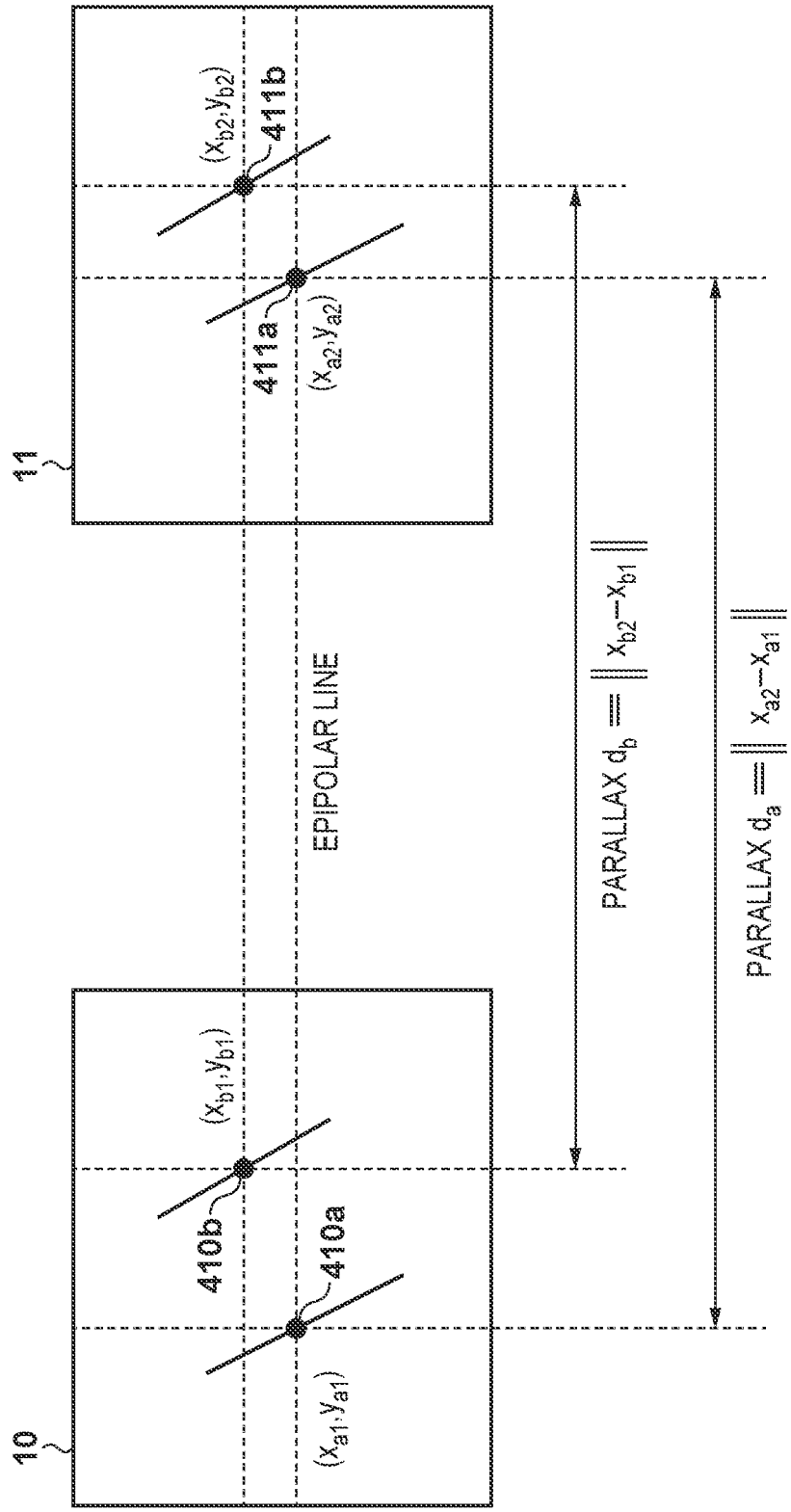

| MODEL EDGE ID | 403 | 404 |
|---|---|---|
| MODEL EDGE GROUP ID | 1 | 1 |
| MODEL EDGE POSITIONAL RELATIONSHIP LABEL | 2 | 1 |

50 —

| IMAGE EDGE ID | 413 | 414 |
|---|---|---|
| IMAGE EDGE GROUP ID | 1 | 1 |
| IMAGE EDGE POSITIONAL RELATIONSHIP LABEL | 2 | 1 |

60 —

| MODEL EDGE ID | 403 | 404 |
|---|---|---|
| IMAGE EDGE ID | 413 | |

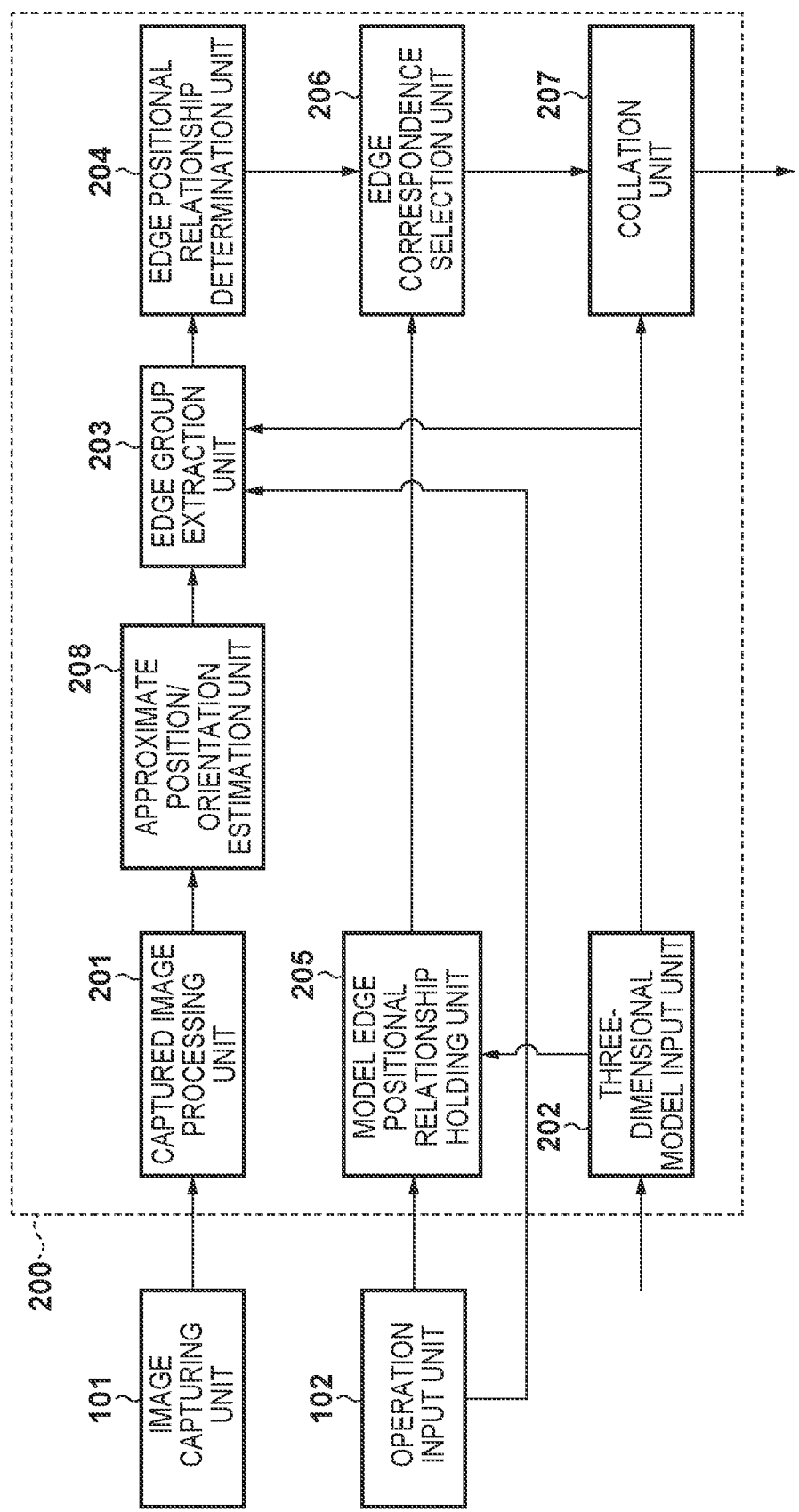

INFORMATION PROCESSING APPARATUS, METHOD OF CONTROLLING INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing apparatus, a method of controlling the information processing apparatus, and a non-transitory computer-readable storage medium and, more particularly, to a technique of estimating the three-dimensional position/orientation of a target object using a captured image acquired by an image capturing apparatus.

Description of the Related Art

In recent years, to grip or operate, using a robot arm, target objects such as components that are arranged at random, an apparatus configured to capture these target objects by an image capturing apparatus and estimate their three-dimensional positions/orientations has been proposed. In such an apparatus, using the design data of a target object created by CAD (Computer-Aided Design) or the like, an image of design data observed from a specific viewpoint and an image of an actually observed target object are compared and collated with each other. The three-dimensional position/orientation of the target object is thus estimated.

Japanese Patent No. 4649559 discloses a method of associating edges obtained from a two-dimensional image obtained by capturing a target object by a camera with edges obtained when the design data of the target object is projected onto the two-dimensional image and estimating the position/orientation of the target object for which the edges match.

In the technique of Japanese Patent No. 4649559, however, an error may occur when associating the edges obtained from the two-dimensional image with the edges obtained from the design data. In particular, this tendency is conspicuous in industrial components because a plurality of parallel edges are readily detected in a narrow range from a two-dimensional image along with processing such as chamfering. For this reason, if a plurality of similar edges are locally detected, the estimation accuracy of the position/orientation of the target object may lower.

The present invention has been made in consideration of the above-described problem, and provides a technique of accurately estimating the position/orientation of a target object even in a case in which a plurality of similar edges are locally detected from an image.

SUMMARY OF THE INVENTION

According to one aspect of the present invention, there is provided an information processing apparatus comprising: an extraction unit configured to extract, as an image edge group, a plurality of image edges in the vicinity, which are detected from a captured image obtained by capturing a target object; a determination unit configured to determine a positional relationship between the image edges included in the image edge group; a holding unit configured to hold a positional relationship between model edges that constitute a three-dimensional model of the target object; a selection unit configured to select a combination of an image edge and a model edge, which correspond to each other, based on matching between the positional relationship of the image edges and the positional relationship of the model edges; and an collation unit configured to estimate a position/orientation of the target object based on the combination.

Further features of the present invention will be apparent from the following description of exemplary embodiments with reference to the attached drawings.

BRIEF DESCRIPTION OF THE DRAWINGS

FIG. 5 is a view showing an example of calculating the parallaxes of image edges according to the first embodiment;

FIGS. 6A to 6C are views showing an example of a scene to perform association according to the first embodiment;

FIG. 11 is a block diagram schematically showing the overall arrangement of an information processing apparatus according to the fifth embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Outline>

In this embodiment, of a plurality of image edges detected from a captured image obtained by capturing a target object, a plurality of image edges in the vicinity are extracted as an image edge group. For example, a plurality of almost parallel image edges detected in the vicinity are extracted as an image edge group. On the other hand, as for model edges (model edges included in design data) that constitute the three-dimensional model of the target object, a plurality of model edges are extracted in advance as a model edge group based on an instruction of a user, and the positional relationship between the model edges is held.

Based on the matching of the positional relationship between the image edges included in the image edge group and the held positional relationship between the model edges, a combination of image edges and model edges, which are correspond to each other, is selected, and the position/orientation of the target object is estimated based on the commination.

More specifically, ordering is performed for the model edges and the image edges based on the three-dimensional geometric relationship of the edges in the groups. The orders of the model edges and the image edges are compared in the groups, and a combination in which they match is selected.

As described above, since appropriate association is performed using the information of the positional relationship between the edges even if a plurality of similar edge combinations exist, it is possible to accurately estimate the position/orientation of the target object.

<Arrangement>

Figure 1:
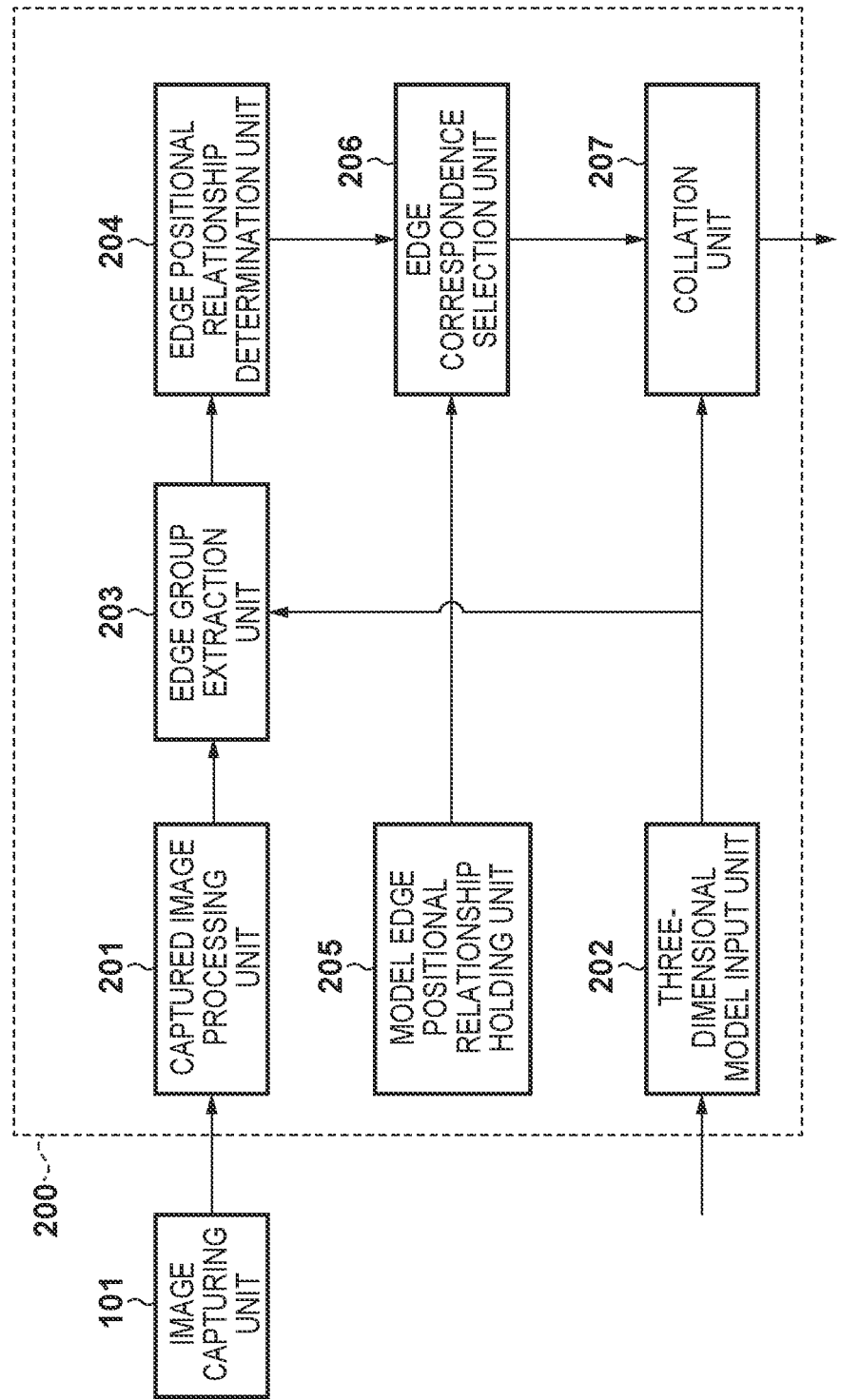
FIG. 1 is a block diagram schematically showing an example of the arrangement of an information processing apparatus according to the first embodiment.

FIG. 1 is a block diagram showing the overall arrangement of an information processing apparatus according to this embodiment. Each rectangular frame in FIG. 1 represents a functional module that performs each process according to this embodiment, and arrows represent the flow of data. Referring to FIG. 1, an information processing apparatus 200 is connected to an image capturing unit 101. The information processing apparatus 200 includes a captured image processing unit 201, a three-dimensional model input unit 202, an edge group extraction unit 203, an edge positional relationship determination unit 204, a model edge positional relationship holding unit 205, an edge correspondence selection unit 206, and an collation unit 207. The function of each processing unit provided in the information processing apparatus 200 is controlled when a CPU (not shown) reads out a program from a memory (not shown) and executes it. Note that the arrangement shown in FIG. 1 is a merely an example, and the present invention is not limited to the arrangement shown in FIG. 1.

The image capturing unit 101 acquires a captured image by capturing a scene including a target object 301 (see FIG. 2) whose three-dimensional position/orientation should be estimated. The captured image acquired by the image capturing unit 101 is input to the captured image processing unit 201.

Figure 2:
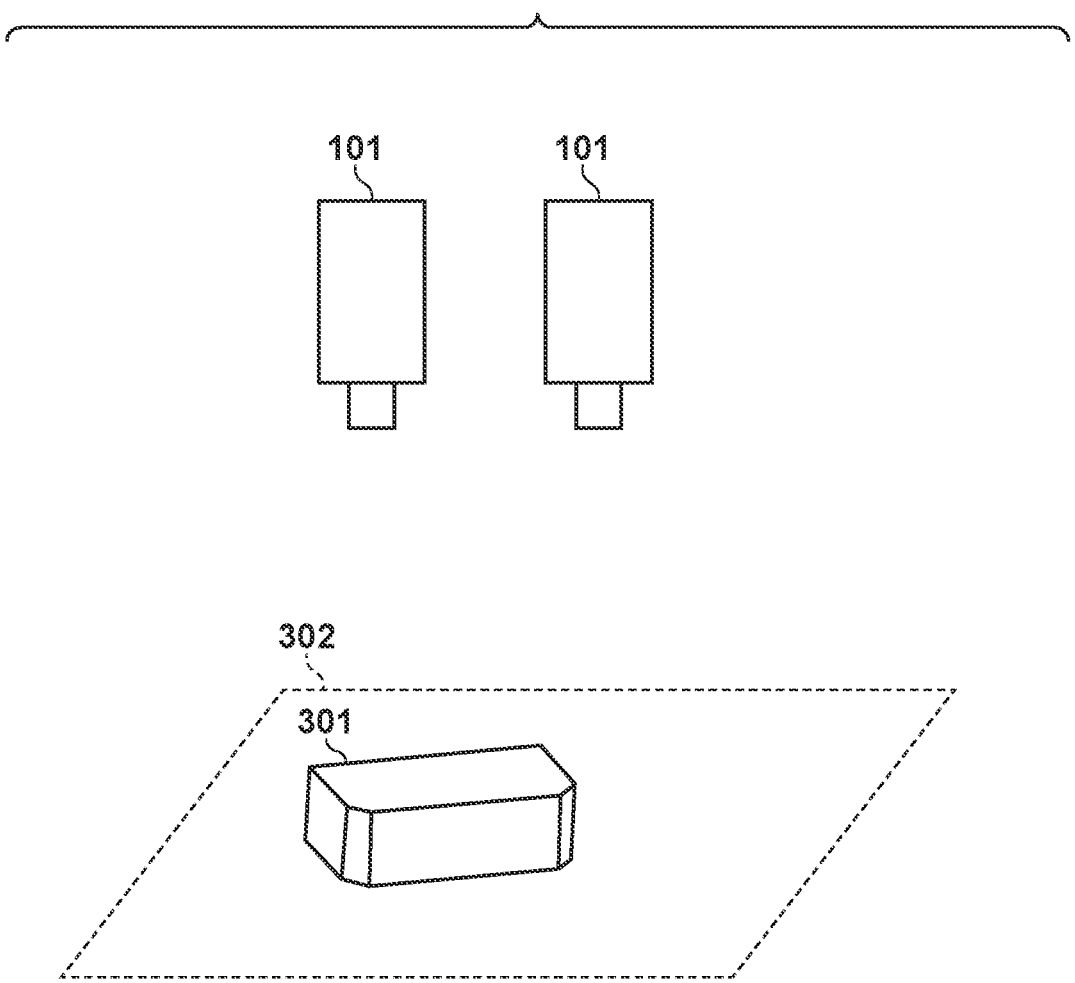
FIG. 2 is a view showing the relationship between image capturing units 101 and a target object 301 according to the first embodiment.

Here, FIG. 2 shows the relationship between the image capturing units 101 and the target object 301 according to this embodiment. The target object 301 is arranged on a plane 302, and two image capturing units 101 acquire captured images 10 and 11 (not shown) by capturing the target object 301 from above while observing the overview thereof. The target object 301 can take various positions/orientations.

Figure 3A:
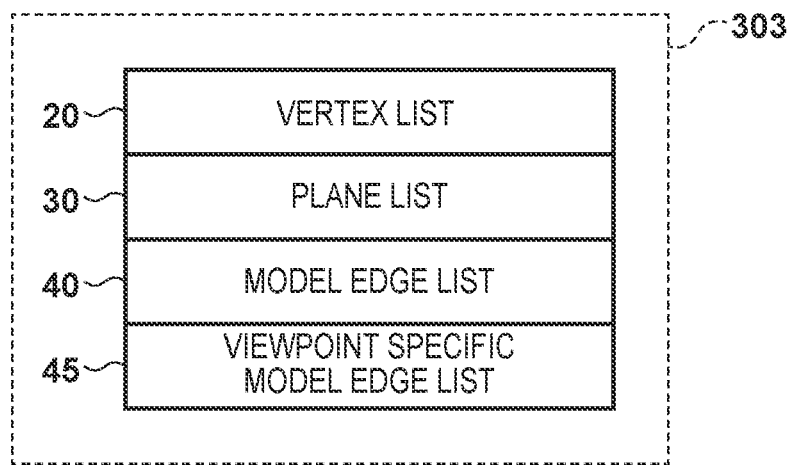
FIGS. 3A to 3E are views showing examples of data structures according to the first embodiment.

As shown in FIG. 3A, for the target object 301, a three-dimensional model 303 that defines the three-dimensional shape and the size of the target object 301 is defined based on design data (for example, CAD data). The three-dimensional model 303 includes a vertex list 20, a plane list 30, a model edge list 40, and a viewpoint specific model edge list 45.

The vertex list 20 includes the list of the three-dimensional coordinates of vertices that constitute the three-dimensional model 303. The plane list 30 includes the list of vertex numbers that form the planes of the target object 301. The model edge list 40 is a list that holds a plurality of pieces of information concerning the model edges that constitute the three-dimensional model 303. The viewpoint specific model edge list 45 is a list that holds the information of a geometric positional relationship in a case in which the model edges that constitute the three-dimensional model 303 are observed from a predetermined position/orientation.

Note that the image capturing units 101 are calibrated, and internal parameters such as the focal length, the image center, and the distortion coefficient are known. In addition, external parameters of the two image capturing units 101 are also known.

Figure 3B:
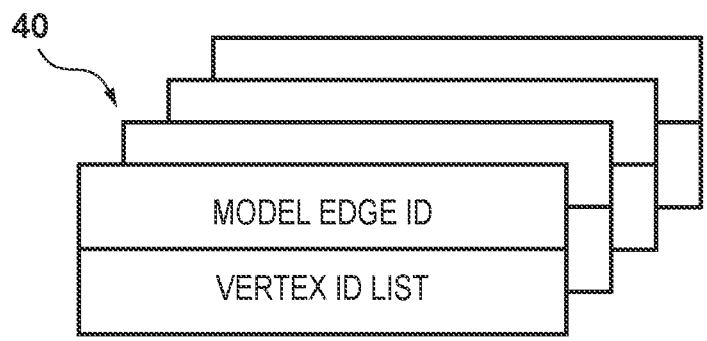

FIG. 3B shows an example of the data structure of the model edge list 40. The model edge list 40 is a list that holds a plurality of pieces of information concerning the model edges that constitute the three-dimensional model 303. Information concerning each model edge includes a model edge ID and an vertex ID list.

Figure 3C:
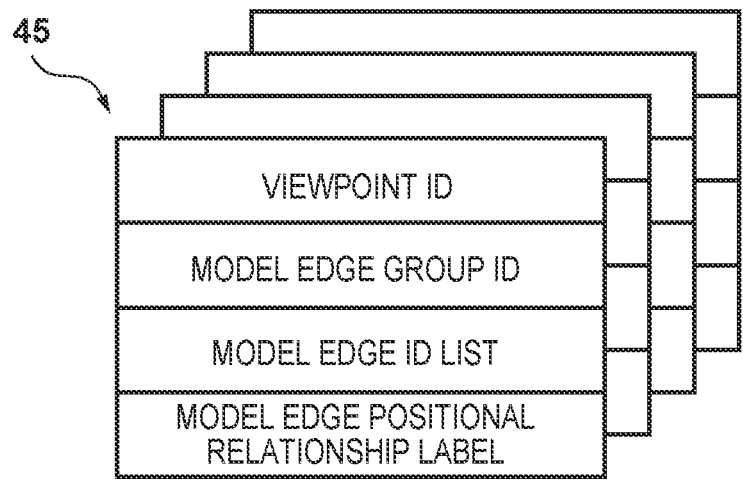

FIG. 3C shows an example of the data structure of the viewpoint specific model edge list 45. The viewpoint specific model edge list 45 is a list that holds the information of a geometric positional relationship in a case in which the model edges that constitute the three-dimensional model 303 are observed from a predetermined position/orientation. Each element is set for each viewpoint assumed to observe the three-dimensional model 303. The viewpoint specific model edge list 45 includes a viewpoint ID, a model edge group ID, a model edge ID list, and a model edge positional relationship label.

In this embodiment, as for a model edge group, model edges whose edge directions and distances on a two-dimensional image obtained by observing the three-dimensional model 303 at a certain viewpoint are put in the same model edge group. The model edge group ID is an ID used to uniquely specify the model edge group. The model edge ID list is the list of model edge IDs included in the model edge group specified by the model edge group ID.

The model edge positional relationship label is a label assigned to the model edges belonging to the model edge group based on three-dimensional depth information. The model edge positional relationship label is set in accordance with the order of the three-dimensional distance from the viewpoint to the edge. For example, for model edges that form the same model edge group, label 1 is assigned to the model edge closest to the viewpoint, and label 2 is assigned to the model edge that is the second closest to the viewpoint. Note that for an isolated model edge, a model edge group including only one model edge is set.

In this embodiment, the approximate position/orientation of the target object 301 can be assumed to be known, and the user generates and prepares in advance the viewpoint specific model edge list 45 at a single viewpoint corresponding to the approximate position/orientation.

The captured image processing unit 201 receives the captured images 10 and 11 captured by the image capturing units 101 into the information processing apparatus 200. At this time, the captured images 10 and 11 are parallelized using calibration parameters. In addition, the captured image processing unit 201 performs edge detection for the captured images 10 and 11, and generates an image edge list 50 to be described later with reference to FIG. 3D. The captured image processing unit 201 sends the generated image edge list 50 and the known approximate position/orientation to the edge group extraction unit 203.

Figure 3D:
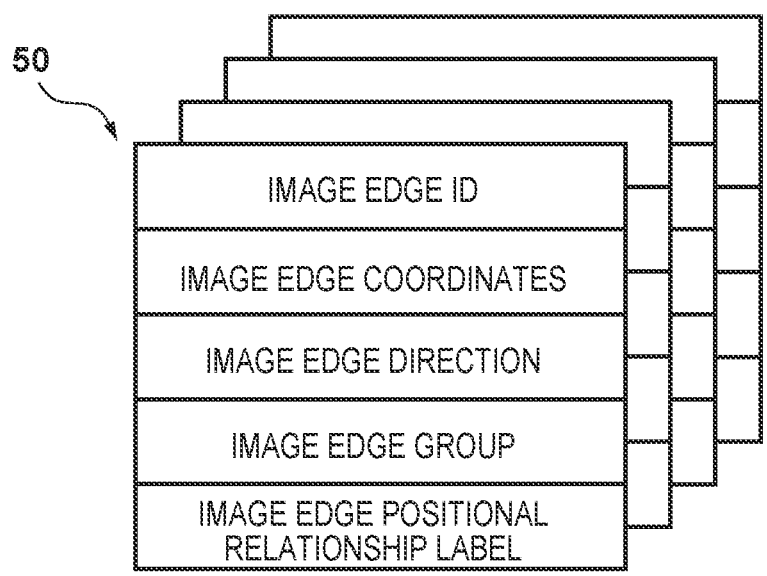

The image edge list 50 is data that holds image edge information detected from the captured images 10 and 11. FIG. 3D shows an example of the data structure of the image edge list 50. The image edge list 50 holds, as a list structure, a plurality of pieces of image edge information each including an image edge ID, image edge coordinates, an image edge direction, an image edge group ID, and an image edge positional relationship label. The image edge ID, the image edge coordinates, and the image edge direction are set by the captured image processing unit 201. The image edge group ID and the image edge positional relationship label are set by the edge group extraction unit 203 and the edge positional relationship determination unit 204, respectively. Note that one image edge list 50 is provided for one captured image. That is, the image edge list 50 is set for each of the captured images 10 and 11.

The three-dimensional model input unit 202 receives the model edge list 40 in the data that constitute the three-dimensional model 303 having the same shape as the target object 301 into the information processing apparatus 200, and sends the model edge list 40 to the edge group extraction unit 203.

The edge group extraction unit 203 refers to the image edge list 50 input from the captured image processing unit 201 and the approximate position/orientation of the target object 301, and extracts an image edge group. The edge group extraction unit 203 performs grouping by assigning the same group ID to image edges in the vicinity and extracts the image edge group. The edge group extraction unit 203 writes the assigned image edge group ID in the image edge list 50, and sends the image edge list 50 to the edge positional relationship determination unit 204.

The edge positional relationship determination unit 204 refers to the image edge list 50 input from the edge group extraction unit 203, and performs labeling based on the relative positional relationship between the image edges that form the same image edge group. The edge positional relationship determination unit 204 writes the image edge positional relationship label in the image edge list 50, and sends the result to the edge correspondence selection unit 206.

The model edge positional relationship holding unit 205 loads the viewpoint specific model edge list 45 created in advance by the user, and holds it in a storage area (not shown). The viewpoint specific model edge list 45 held by the model edge positional relationship holding unit 205 is read out by the edge correspondence selection unit 206 any time.

Figure 3E:
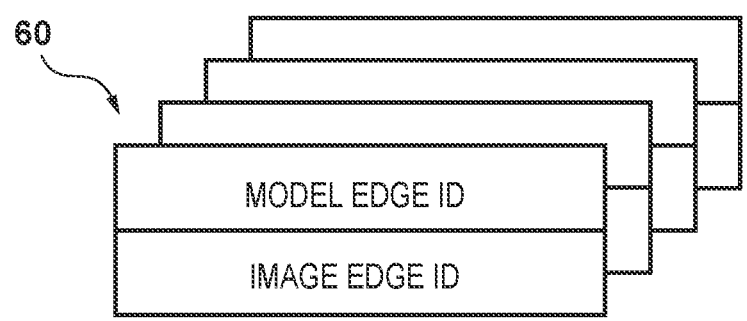

The edge correspondence selection unit 206 refers to the viewpoint specific model edge list 45 held by the model edge positional relationship holding unit 205 and the image edge list 50 input from the edge positional relationship determination unit 204. By the reference, the combination of an image edge detected from the captured image 10 and a model edge that constitutes the three-dimensional model 303 is selected, and the edges are associated. The result of the association is written in an edge correspondence list 60. The edge correspondence selection unit 206 sends the edge correspondence list 60 to the collation unit 207. Here, FIG. 3E shows an example of the data structure of the edge correspondence list 60. The edge correspondence list 60 holds, as a list structure, pairs of model edge IDs and image edge IDs.

The collation unit 207 collates the captured image 10 with the target object 301, and estimates the three-dimensional position/orientation of the target object 301. In this embodiment, the collation unit 207 refers to the edge correspondence list 60 generated by the edge correspondence selection unit 206, and estimates the three-dimensional position/orientation of the target object 301. More specifically, optimization is performed to minimize, on the image plane, the difference between a model edge in a case in which a model edge that constitutes the three-dimensional model 303 is projected onto the captured image 10 and an image edge detected from the captured image 10, thereby estimating the three-dimensional position/orientation of the target object 301. At this time, an image edge and a model edge, which correspond to IDs described in the edge correspondence list 60, are associated. Note that in a case in which the residual in the optimization is large, the collation unit 207 determines that the target object 301 and the three-dimensional model 303 are not collated, and outputs an error.

<Processing>

Figure 4:
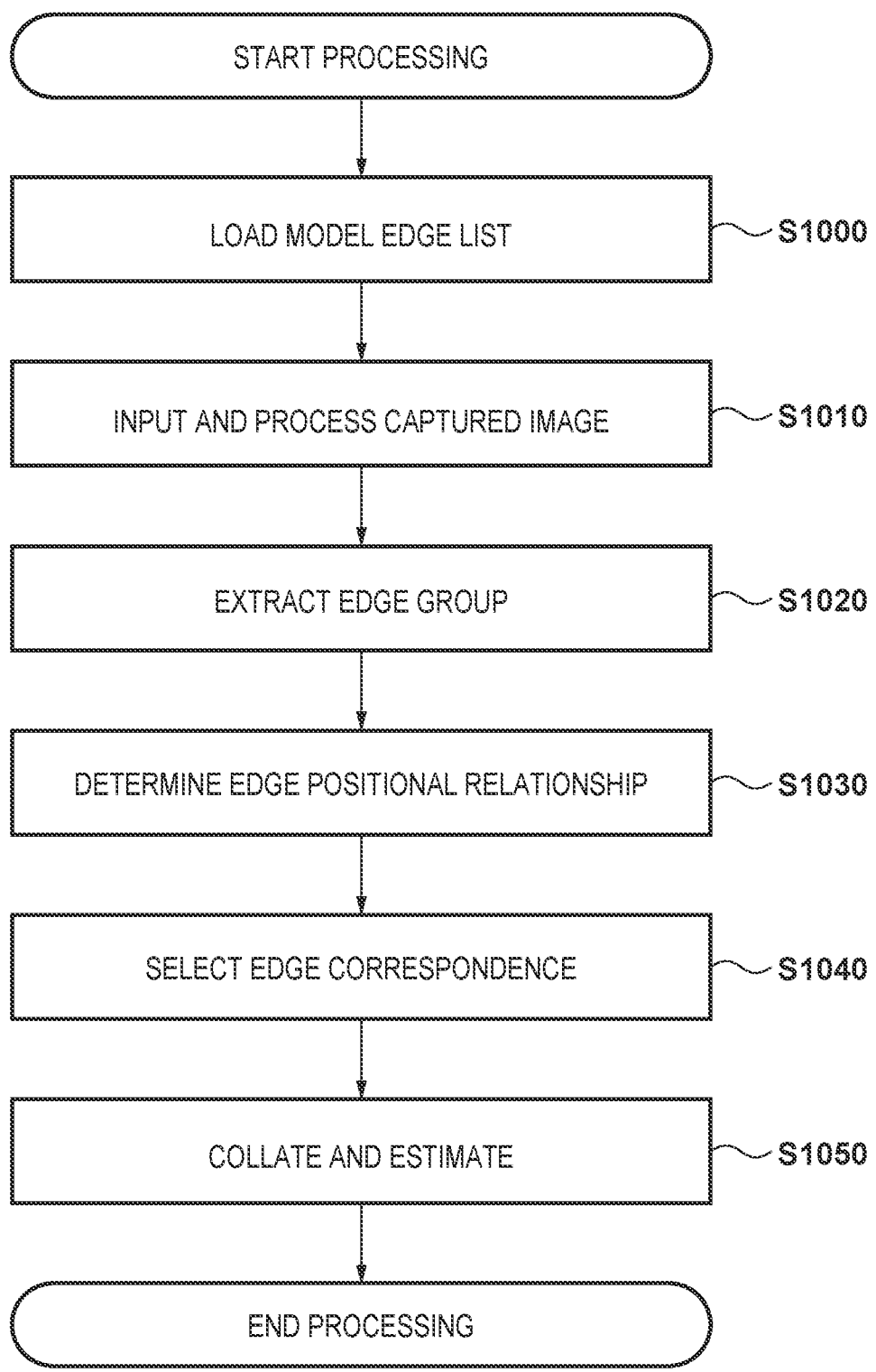
FIG. 4 is a flowchart showing the procedure of processing executed by the information processing apparatus according to the first embodiment.

The procedure of processing executed by the information processing apparatus 200 according to this embodiment will be described next with reference to the flowchart of FIG. 4.

(Step S1000)

In step S1000, the model edge positional relationship holding unit 205 loads the viewpoint specific model edge list 45 prepared in advance, and holds it in the storage area (not shown).

(Step S1010)

In step S1010, the captured image processing unit 201 acquires the captured images 10 and 11 of a scene including the target object 301 captured by the image capturing units 101. In this embodiment, two image capturing units 101 are provided, and the captured images 10 and 11 are captured by the image capturing units 101 with different viewpoint positions.

The captured image processing unit 201 applies a Sobel filter to the captured images 10 and 11 to perform edge detection processing. In the following description, edges detected from the captured images 10 and 11 will be referred to as image edges. The captured image processing unit 201 writes image edge coordinates and an image edge direction in the image edge list 50 in correspondence with each pixel that forms an image edge.

(Step S1020)

In step S1020, the edge group extraction unit 203 groups the detected image edges and assigns an image edge group ID. The grouping processing performed by the edge group extraction unit 203 will be described below.

First, the edge group extraction unit 203 refers to the image edge list 50, applies each image edge to a straight line, and estimates an approximate line segment for each image edge. There are many line segment estimation methods, and a method such as RANSAC (Random Sampling Consensus) or Hough transform is used. For all combinations of approximate line segments, the edge group extraction unit 203 generates a distance table concerning a distance $d_{ij}$ between an approximate line segment i and an approximate line segment j. Clustering is applied to the distance table, approximate line segments belonging to the same cluster are put into one image edge group, and an image edge group ID is assigned.

The edge group extraction unit 203 writes the image edge group ID obtained by the above-described processing in the image edge list 50.

(Step S1030)

In step S1030, the edge positional relationship determination unit 204 determines the relative positional relationship between edges that form the same image edge group ID and performs labeling.

First, the edge positional relationship determination unit 204 performs stereo matching for the captured images 10 and 11 and calculates a parallax amount for each image edge. Here, FIG. 5 shows an example of calculating the parallax amounts of image edges according to this embodiment. The edge positional relationship determination unit 204 calculates the parallax amounts between image edges 410a and 410b detected in the captured image 10 and corresponding image edges 411a and 411b in the captured image 11. In this embodiment, the epipolar lines of the captured images 10 and 11 are parallelized so as to be parallel to the X-axis. Hence, the edge positional relationship determination unit 204 calculates the differences between the x-coordinates of the captured images 10 and 11 at the image edges 410a and 410b. As shown in FIG. 5, the parallax amount between the image edges 410a and 411a is $d_a=\|x_{a2}-x_{a1}\|$. In addition, the parallax amount between the image edges 410b and 411b is $d_b=\|x_{b2}-x_{b1}\|$. In this way, the parallax amounts are calculated based on the differences between the coordinates on the image edges detected from the plurality of images of different viewpoints.

Next, the edge positional relationship determination unit 204 extracts a list of image edge IDs of the same image edge group ID from the image edge list 50 corresponding to the captured image 10. The edge positional relationship determination unit 204 refers to the result of the above-described stereo matching, acquires the parallax amounts to the corresponding image edges in the captured image 11, and sorts the image edges in descending order of parallax amounts (that is, in ascending order of distances from the viewpoint). Since the parallax amount of an image edge and the depth to the image edge are inversely proportional to each other, the image edges are rearranged based on the distances (depth information) from the viewpoint.

In this way, the depth information can be determined based on the differences between the coordinates on the image edges detected from the plurality of images of different viewpoints.

Subsequently, the edge positional relationship determination unit 204 assigns an image edge positional relationship label to each image edge in the same image edge group based on the sort result. In this embodiment, the image edge positional relationship label is an order after the sort. That is, "1" is assigned as the image edge positional relationship label to the image edge with the largest parallax amount (that is, closest to the viewpoint). Then, "2" is assigned as the image edge positional relationship label to the image edge with the second largest parallax amount.

The edge positional relationship determination unit 204 writes, in the image edge list 50, the positional relationship labels obtained by the above-described processing.

(Step S1040)

In step S1040, the edge correspondence selection unit 206 refers to the image edge list 50 updated by the edge positional relationship determination unit 204 and the viewpoint specific model edge list 45 held by the model edge positional relationship holding unit 205. By the reference, the image edges detected from the captured image 10 are associated with the model edges that constitute the three-dimensional model 303.

First, the edge correspondence selection unit 206 extracts an element of almost the same viewpoint ID as the viewpoint of the captured image 10 from the viewpoint specific model edge list 45 using the approximate position/orientation. Next, using the model edge list 40 and the approximate position/orientation, the edge correspondence selection unit 206 projects the model edges onto the captured image 10 and calculates the image coordinates of each model edge projected onto the captured image 10 and the direction of the model edge on the captured image 10.

Figure 6A:
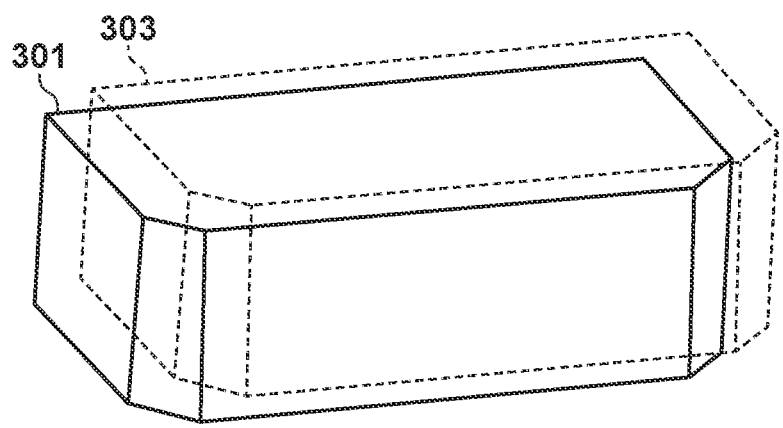

Here, FIG. 6A is a view showing an example of a scene to perform association. FIG. 6A shows image edges detected for the target object 301 in the captured image 10 and an image formed by projecting the three-dimensional model 303 corresponding to the target object 301 onto the captured image 10. In the following explanation, the edge correspondence selection unit 206 performs the association processing on the two-dimensional image. That is, although the model edges are defined on a three-dimensional space, they are handled as projected onto a two-dimensional image plane in the following processing.

Figure 6B:
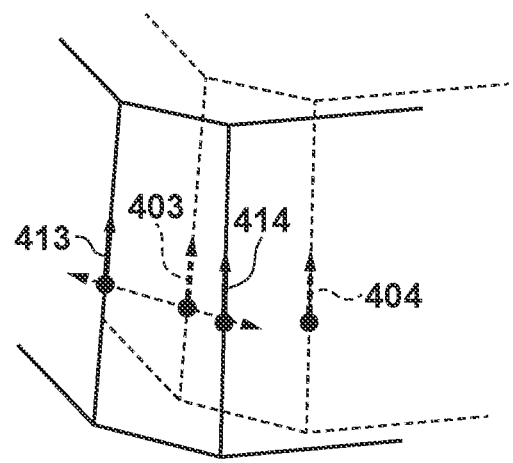

FIG. 6B is an enlarged view of a part of FIG. 6A. Solid lines indicate the image edges detected from the captured image 10, and broken lines indicate a state in which the model edges of the three-dimensional model 303 are projected onto the captured image 10. A model edge 403 is a model edge that is a current processing target. The edge correspondence selection unit 206 associates the most appropriate image edge with the model edge 403. Image edges 413 and 414 are detected as candidates. Note that the arrows of the model edges 403 and 404 and the image edges 413 and 414 indicate the directions of the edges.

FIG. 6C is a view showing an excerpt of data associated with the description from the viewpoint specific model edge list 45, the image edge list 50, and the edge correspondence list 60. By the above-described processing, model edge group IDs, model edge positional relationship labels, image edge group IDs, and image edge positional relationship labels are assigned for the viewpoint specific model edge list 45 and the image edge list 50.

For the model edge 403 that is the current processing target, the edge correspondence selection unit 206 searches for image edges in an almost vertical direction of the model edge projected onto the two-dimensional image, and selects an image edge that satisfies an appropriate correspondence relationship. At this time, an image edge whose distance from the model edge is equal to or less than a threshold and whose direction is almost parallel to the model edge 403 is set as a selection candidate. In FIG. 6B, the image edges 413 and 414 are detected as the selection candidates of the model edge 403.

Next, the edge correspondence selection unit 206 confirms the matching of correspondence in ascending order of distances from the model edge 403 in the detected image edge selection candidates. In FIG. 6B, the image edge whose distance from the model edge 403 is shortest is the image edge 414. The edge correspondence selection unit 206 refers to the image edge positional relationship label of the image edge 414, and confirms whether the label matches the model edge positional relationship label of the model edge 403. In this example, since the image edge positional relationship label of the image edge 414 is 1, and the model edge positional relationship label of the model edge 403 is 2, as shown in FIG. 6C, they do not match. For this reason, the edge correspondence selection unit 206 determines that the image edge 414 "does not correspond" to the model edge 403, and does not select the image edge 414.

The edge correspondence selection unit 206 performs the same processing as described above for the second closest image edge 413. Since the image edge positional relationship label of the image edge 413 is 2, and the model edge positional relationship label of the model edge 403 is 2, they match. For this reason, the edge correspondence selection unit 206 determines that the image edge 413 "corresponds" to the model edge 403, and selects the image edge 413. At this time, the edge correspondence selection unit 206 writes the ID of the image edge 413 in the edge correspondence list 60.

That is, the edge correspondence selection unit 206 compares the model edge positional relationship label with the image edge positional relationship label, which are set based on the distances from the viewpoint, and if they match, performs association and selects the image edge. Accordingly, in a case in which the distance on the image is short, but the three-dimensional positional relationship between the image edges does not match the three-dimensional positional relationship between the model edges, the edges can be prevented from being erroneously associated.

(Step S1050)

In step S1050, the collation unit 207 collates the captured image 10 with the target object 301, and estimates the three-dimensional position/orientation of the target object 301. The collation unit 207 refers to the edge correspondence list 60 generated by the edge correspondence selection unit 206. For all combinations of the model edges and the image edges, which pair in the edge correspondence list 60, a position/orientation at which the sum of the distances between the coordinates of the model edges projected onto the two-dimensional image (captured image) and the coordinates of the image edges is minimized is calculated by optimization. The three-dimensional position/orientation of the target object 301 is thus estimated.

Then, the collation unit 207 outputs the estimated position/orientation of the target object 301 to the outside. Note that if the residual in the optimization processing at the time of estimation of the three-dimensional position/orientation is equal to or more than a predetermined value, the collation unit 207 determines that the target object 301 and the three-dimensional model 303 do not match, and outputs an error. The series of processes shown in FIG. 4 thus ends.

Note that an example in which in step S1010, a Sobel filter is used as the processing of performing edge detection for the captured images 10 and 11 by the captured image processing unit 201 has been described. However, the processing is not limited to the Sobel filter. Detection processing using another filter such as a Canny filter or a Laplacian filter may be performed.

In addition, an example in which in step S1020, the edge group extraction unit 203 groups image edges in the vicinity based on the distances between approximate line segments representing the image edges has been described. Concerning the distance calculated here, weighting may be performed using the relative angle between two edges. For example, if two approximate line segments are almost vertical, weighting may be performed to increase the distance value so they do not belong to the same group.

Additionally, in step S1030, the edge positional relationship determination unit 204 need not always perform labeling. If the edge correspondence selection unit 206 processes the model edges in ascending order of distances from the viewpoint at the time of association processing, and for the image edges as well, the search is performed in descending order of parallax amounts, the labeling processing can be omitted. At this time, a processed flag may be assigned to an associated image edge, and when performing association with the next model edge, the processing may be performed only for image edges without the processed flag assigned.

Also, in step S1030, the stereo matching performed by the edge positional relationship determination unit 204 need only be performed for the image edges included in the image edge list 50, and need not be performed for all pixels of the captured images 10 and 11. As the stereo matching, many methods such as block matching and semi-global matching are known, and any method is usable. By the stereo matching, the parallax amount between the captured images 10 and 11 can be obtained for each image edge included in the image edge list 50.

[Modification 1]

Instead of providing two image capturing units 101, a three-dimensional measurement apparatus may separately be provided, the positional relationship between image edges may be determined based on the three-dimensional coordinates of the image edges, and image edge positional relationship labels may be assigned. In this case, in step S1030, the edge positional relationship determination unit 204 rearranges the image edges by calculating the distances between the viewpoint and the image edges based on the obtained three-dimensional coordinates of the image edges and assigns image edge positional relationship labels.

[Modification 2]

Instead of providing two image capturing units 101, one image capturing unit 101 may be configured to be movable, the positional relationship between image edges may be determined based on a plurality of images captured from different viewpoints at different times, and image edge positional relationship labels may be assigned. In this case, in step S1030, the edge positional relationship determination unit 204 estimates the position/orientation of the image capturing unit 101 at the time of image capturing based on a position/orientation sensor separately provided in the image capturing unit 101 or feature points in the images. The edge positional relationship determination unit 204 then calculates the three-dimensional coordinates of the image edges based on the coordinates of the image edges observed in the two images and the position/orientation of the image capturing unit 101. The edge positional relationship determination unit 204 rearranges the image edges by calculating the distances between the viewpoint and the image edges based on the obtained three-dimensional coordinates and assigns image edge positional relationship labels.

[Modification 3]

In step S1050, instead of outputting the calculated final position/orientation of the target object 301 to the outside, the collation unit 207 may be configured to check whether the position/orientation of the target object 301 input in advance matches the calculated position/orientation and output the result. Alternatively, if a plurality of three-dimensional models 303 exist, the collation unit 207 may be configured to output the type of the three-dimensional model 303 that is most similar to the target object 301.

[Modification 4]

In step S1050, instead of outputting the calculated position/orientation of the target object 301 to the outside, the collation unit 207 may be configured to determine whether to normally end the calculation of the position/orientation to determine the existence of the target object 301 and output the result. If the calculation of the position/orientation does not converge, or if the residual is equal to or more than a predetermined value, it may be determined that the target object 301 does not exist.

As described above, according to this embodiment, a plurality of images obtained from the image capturing units are used, and ordering is performed for a plurality of edges in the vicinity using three-dimensional information. Since this can avoid wrong association, the three-dimensional position/orientation of the target object can accurately be estimated.

Second Embodiment

<Outline>

In this embodiment, for image edges detected from an image, almost parallel image edges detected in the vicinity are grouped. Model edges included in design data are also grouped based on the geometric relationship from a plurality of viewpoints to observe a target object. Then, for the model edges and the image edges, ordering is performed based on the three-dimensional geometric relationship between the edges in the groups. The orders of the model edges and the image edges are compared for the groups, and a combination in which these match is selected.

As described above, since appropriate association is performed using three-dimensional information even if a plurality of similar edge combinations exist, it is possible to accurately estimate the position/orientation of the target object.

In the first embodiment, grouping of the model edges is performed based on an instruction from the user. This embodiment is different from the first embodiment in that grouping of the model edges is performed not based on an instruction from the user but based on the geometric information from the plurality of viewpoints to observe the target object. Additionally, this embodiment is also different in that the approximate position/orientation of the target object is estimated.

<Arrangement>

Figure 7:
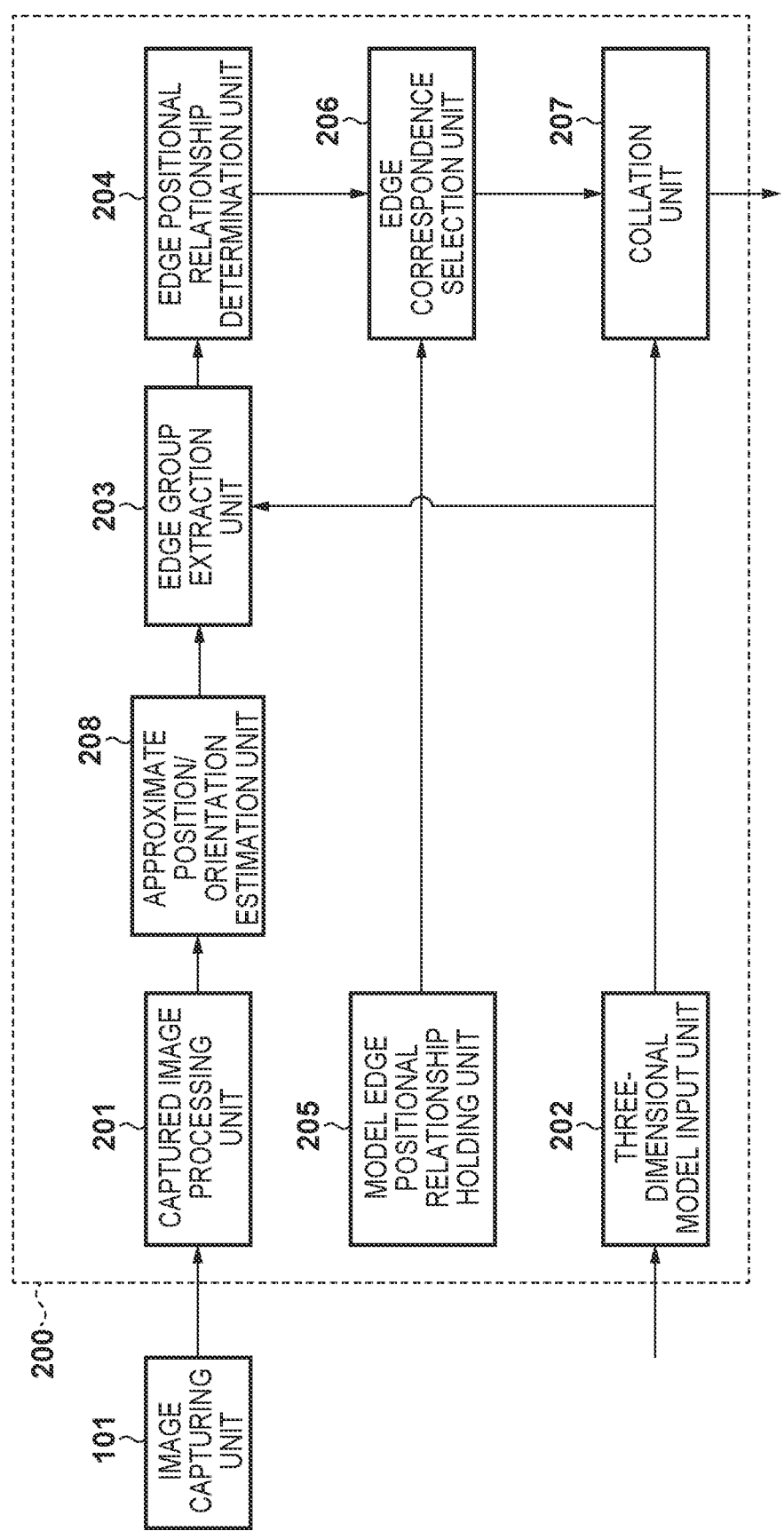
FIG. 7 is a block diagram schematically showing the overall arrangement of an information processing apparatus according to the second embodiment.

FIG. 7 is a block diagram showing the overall arrangement of an information processing apparatus 200 according to this embodiment. As compared to the arrangement of the first embodiment shown in FIG. 1, an approximate position/orientation estimation unit 208 is added. The differences from the first embodiment will mainly be described below, and a description of the same parts will be omitted.

A model edge positional relationship holding unit 205 according to this embodiment generates a viewpoint specific model edge list 45 based on a three-dimensional model 303 input from a three-dimensional model input unit 202.

The approximate position/orientation estimation unit 208 estimates the approximate position/orientation of a target object 301 captured in a captured image 10 or 11.

<Processing>

Figure 8A:
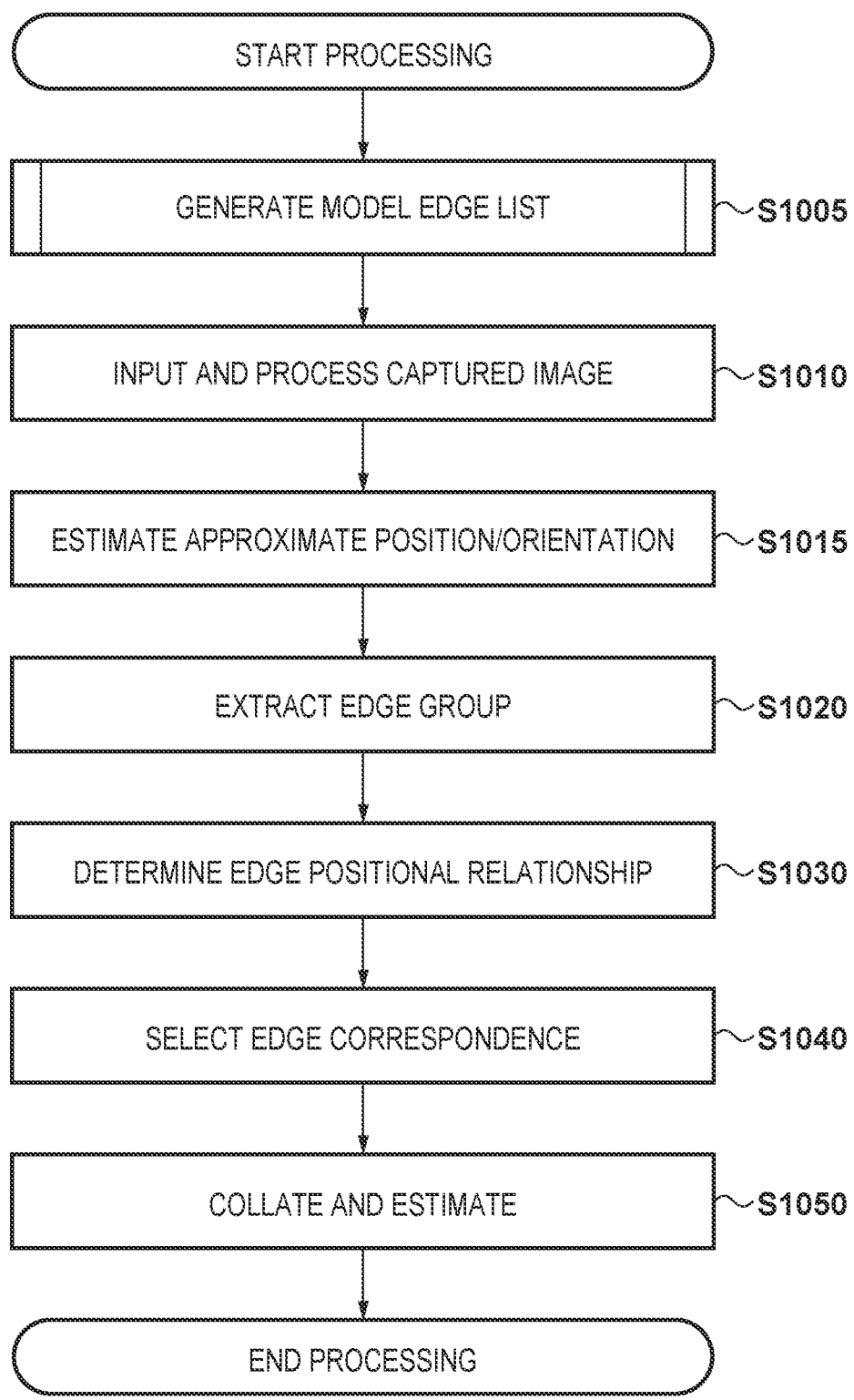
FIGS. 8A and 8B are flowcharts showing the procedure of processing executed by the information processing apparatus according to the second embodiment.
Figure 8B:
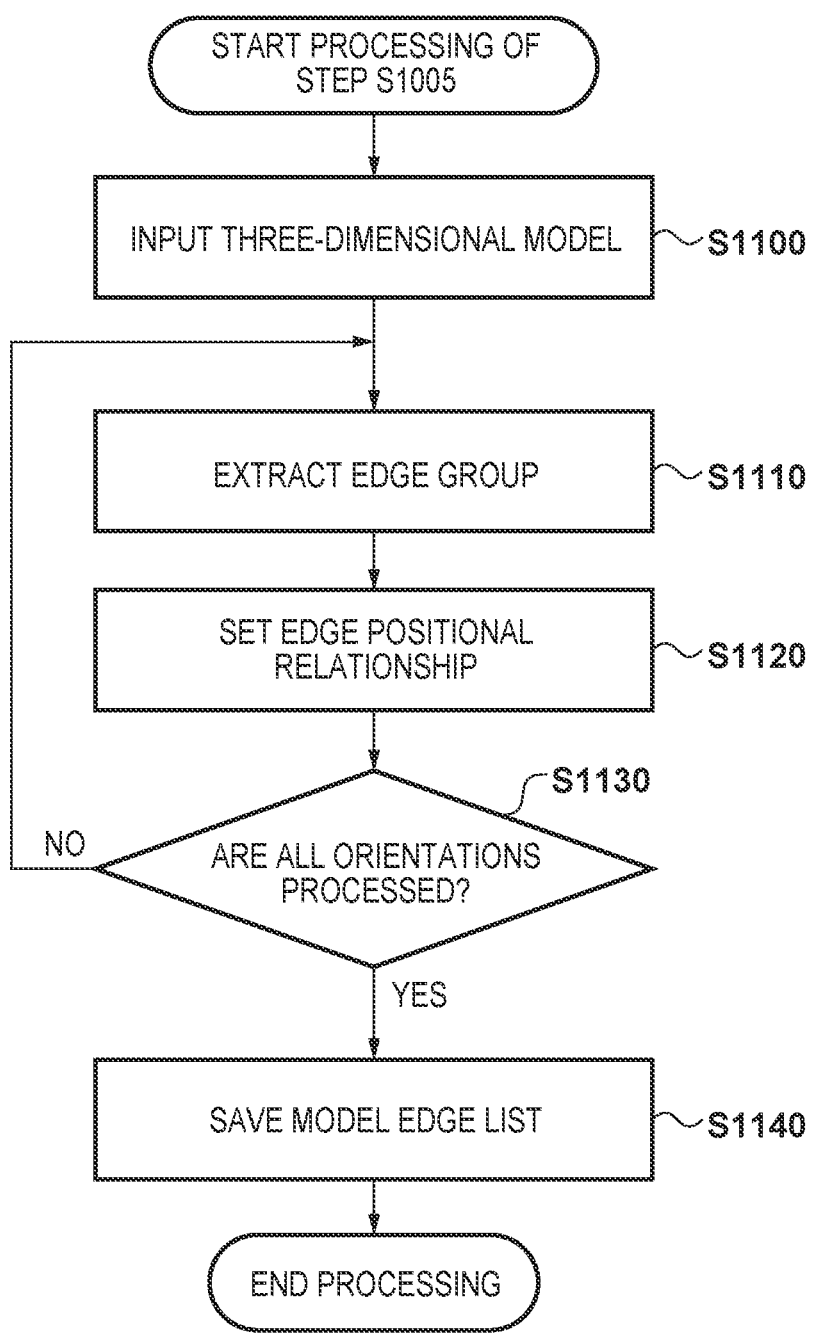

The procedure of processing executed by the information processing apparatus 200 according to this embodiment will be described next with reference to the flowcharts of FIGS. 8A and 8B. FIG. 8A shows the procedure of overall processing, and FIG. 8B shows details of the processing of step S1005 in FIG. 8A.

In step S1005, the model edge positional relationship holding unit 205 generates the viewpoint specific model edge list 45 based on a virtually set viewpoint position and the three-dimensional model 303. Note that the processing of step S1005 is executed only once as a preparation before the subsequent processing.

Details of the processing of step S1005 will be described here with reference to FIG. 8B.

(Step S1100)

In step S1100, the three-dimensional model input unit 202 loads the three-dimensional model 303 having the same shape as the target object 301. The three-dimensional model 303 according to this embodiment is generated from CAD data used to design the target object 301. As described above with reference to FIG. 3A, the three-dimensional model 303 includes a model edge list 40. Also, in step S1100, the three-dimensional model input unit 202 sets a plurality of approximate orientations that the target object 301 can actually take.

Figure 9:
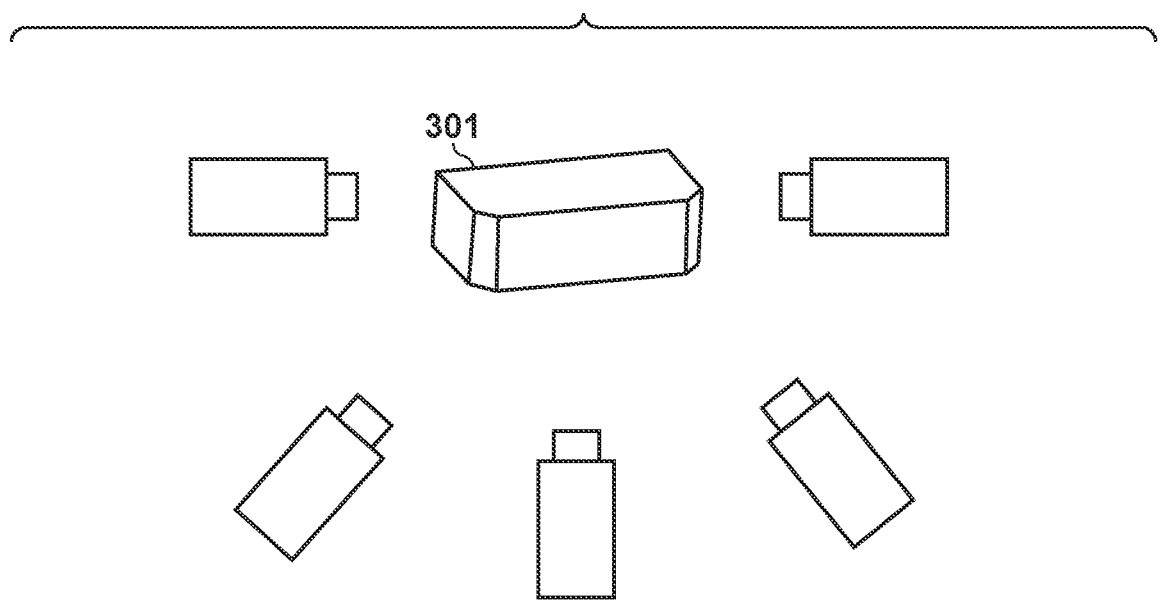
FIG. 9 is a view showing a state in which a virtual viewpoint to observe a target object 301 is set in the second embodiment.

In this embodiment, a regular polyhedron that arranges the target object 301 at the center of a circumscribed sphere is assumed, and virtual viewpoints to observe the target object 301 are set at the positions of vertices of the regular polyhedron. Since observing, from a plurality of set viewpoints, the target object 301 whose position/orientation does not change and observing, from a fixed viewpoint, the target object 301 whose position/orientation changes are equivalent, approximate orientations that the target object 301 can actually take are thus set. FIG. 9 shows a state in which the target object 301 is observed from a plurality of set viewpoints.

Processing from step S1110 to step S1140 is executed a number of times equal to the number of viewpoints set in step S1100. That is, when executing the processing from step S1110 to step S1140, the viewpoints calculated in step S1100 are sequentially set.

(Step S1110)

In step S1110, an edge group extraction unit 203 groups model edges and assigns a model edge group ID. The edge group extraction unit 203 projects the model edges described in the model edge list 40 from a viewpoint set in step S1100 onto a two-dimensional image, and calculates the projection coordinates and directions of the model edges projected onto the two-dimensional image. The edge group extraction unit 203 calculates the projection coordinates and the directions for all edges that are included in the model edge list 40 and can be observed on the two-dimensional image.

Next, the edge group extraction unit 203 refers to the projection coordinates and the direction of each model edge, and calculates a distance d between two model edges for all combinations of the model edges in the three-dimensional model 303. The calculation method of the distance d will be described below.

In this embodiment, a model edge is defined three-dimensionally because it is a line segment between two vertices that are three-dimensionally expressed. However, the distance d is two-dimensionally calculated on the image plane on which the model edge is projected. Two model edges are defined as model edge 1 and model edge 2. If model edges 1 and 2 cross on the image plane on which the model edges are projected, the distance d is 0. If model edges 1 and 2 do not cross, the distance up to model edge 2 is obtained for each of the two vertices that form model edge 1, and a smaller one is set as the distance d.

For all combinations of the model edges that constitute the three-dimensional model 303, the edge group extraction unit 203 generates a distance table concerning a distance $d_{ij}$ between a model edge i and a model edge j. Clustering is applied to the distance table, and the same model edge group ID is assigned to the model edges belonging to the same cluster.

At this time, the edge group extraction unit 203 defines the threshold of the distance used to determine the same cluster in the following way. When the current viewpoint moves to an adjacent viewpoint set in step S1100 (that is, an adjacent viewpoint of the polyhedron that defines the viewpoints), the edge group extraction unit 203 calculates the change amount of coordinates at which the model edge is projected on the two-dimensional image. The edge group extraction unit 203 sets the maximum coordinate change amount to the threshold of the distance used to determine the same cluster. This threshold represents the range of the variation amount of a model edge to the variation of the approximate position/orientation of the target object 301. If the distance between the model edges becomes less than the threshold, a plurality of candidates of correspondence between a model edge and an image edge are generated, and the probability of causing wrong association becomes high. To make these belong to the same model group, the threshold of the distance used to determine the same cluster is set based on the variation in the approximate position/orientation, thereby more effectively preventing wrong association.

The edge group extraction unit 203 writes the model edge group ID obtained by the above-described processing in the viewpoint specific model edge list 45.

(Step S1120)

In step S1120, an edge positional relationship determination unit 204 determines the relative positional relationship between the model edges that form the same model edge group and performs labeling.

The edge positional relationship determination unit 204 extracts the list of model edge IDs belonging to the same model edge group ID from the viewpoint specific model edge list 45. The edge positional relationship determination unit 204 performs the following processing for the model edges corresponding to the extracted list of the model edge IDs while referring to the model edge list 40.

The edge positional relationship determination unit 204 calculates, for each model edge, the distance from the viewpoint set in step S1100, and sorts the model edges in ascending order of distances. As for the distance from the viewpoint to the model edge, of the distances between the viewpoint position and the three-dimensional coordinates of the two vertices that define each model edge, a smaller one is selected.

Next, the edge positional relationship determination unit 204 assigns a model edge positional relationship label to each model edge in the same model edge group based on the sort result. In this embodiment, the model edge positional relationship label is assigned in the order of the sort result. That is, "1" is assigned as the model edge positional relationship label to the model edge with the shortest distance from the viewpoint. Then, "2" is assigned as the model edge positional relationship label to the model edge with the second shortest distance.

The edge positional relationship determination unit 204 writes, in the viewpoint specific model edge list 45, the model edge positional relationship labels obtained by the above-described processing.

(Step S1130)

In step S1130, the three-dimensional model input unit 202 determines whether all the viewpoints set in step S1100 are processed. If all the viewpoints are processed, that is, if all the orientations are processed, the process advances to step S1140. Otherwise, the process returns to step S1110 to execute the processing of steps S1110 to S1130 for an unprocessed viewpoint (unprocessed orientation).

(Step S1140)

In step S1140, a model edge positional relationship holding unit 205 outputs the generated viewpoint specific model edge list 45 to an external storage area (not shown).

The series of processes shown in FIG. 8B is as described above.

After that, referring back to FIG. 8A, in step S1015, the approximate position/orientation estimation unit 208 estimates the approximate position/orientation of the target object 301 in the captured image 10 or 11. In this embodiment, since the external parameters of the two image capturing units 101 are known, the approximate position/orientation need only be estimated for only one of the captured images 10 and 11. In addition, the approximate position/orientation calculated in this step need only have a precision that does not change the positional relationship between the edges, the arrangement order, and the structure on the image plane in a case in which the edges that form the target object 301 are observed from the viewpoint of the captured image 10 or 11. To estimate the approximate position/orientation, a method described in S. Hinterstoisser et al, "Gradient Response Maps for Real-Time Detection of Texture-Less Objects," TPAMI, 2012, can be used. The rest of the processing is the same as described in the first embodiment, and a description thereof will be omitted.

In step S1040, an edge correspondence selection unit 206 projects the model edges onto the captured image 10 using the model edge list 40 and the approximate position/orientation estimated in step S1015, and subsequently performs the same processing as in the first embodiment. That is, the combination of an image edge and a model edge, which correspond to each other, is selected based on matching between the positional relationship between the image edges and the positional relationship between the model edges corresponding to almost the same viewpoint as the viewpoint of the captured image 10.

Note that in step S1110 according to this embodiment, any method can be used concerning the clustering performed by the edge group extraction unit 203.

[Modification 5]

Even in a case in which an image capturing unit 101 or the target object 301 is at standstill, the correspondence relationship between a model edge and an image edge may be inconstant and may change depending on time due to the influence of image noise or the like. As a result, although the scene is static, the position/orientation of the target object 301 is observed as if it varied and finely moved in each time. To avoid this, the edge correspondence selection unit 206 may prefer to a preceding association result. More specifically, if the approximate position/orientation estimation result in step S1015 is almost the same as in the preceding frame, the preceding association result may directly be applied. That is, only in a case in which the approximate position/orientation estimation result changes from the preceding frame by a predetermined amount or more, the processing of steps S1020 to S1040 according to this embodiment may be performed.

[Modification 6]

In step S1120, when the edge positional relationship determination unit 204 writes a model edge positional relationship label in the viewpoint specific model edge list 45, information concerning the visibility of the model edge may be added. Depending on the viewpoint position or orientation, a specific model edge may not be observed and may disappear from the image because of hiding. If the model edge is not observed as an image edge and disappears, mismatching may occur between the positional relationship labels of the model edge and the image edge at the time of the processing in step S1040. For this reason, in step S1120, in a case in which the possibility that the model edge is not observed becomes high due to a slight change in the viewpoint position/orientation, information concerning the disappearance possibility is added to the model edge. Then, in step S1040, in a case in which the positional relationship labels of the model edge and the image edge do not match, and information concerning the disappearance possibility is added to the model edge as information concerning the visibility of the model edge, the edge correspondence selection unit 206 determines that the model edge has disappeared, and does not perform the association.

[Modification 7]

In this embodiment, the processing of step S1005 is executed as a preparation before activation of the information processing apparatus. However, the processing may be executed online after activation of the information processing apparatus. In this case, instead of setting a plurality of viewpoints by the three-dimensional model input unit 202 in step S1100, the model edge positional relationship holding unit 205 may generate the viewpoint specific model edge list 45 from the approximate position/orientation in step S1040. That is, instead of generating the viewpoint specific model edge list 45 at a plurality of assumed viewpoints in advance, the viewpoint specific model edge list 45 may be generated each time based on the current approximate position/orientation.

[Modification 8]

In step S1110, instead of setting the threshold of the distance used to determine the same cluster by the edge group extraction unit 203, the user may be caused to input a value.

As described above, according to this embodiment, the model edges included in the design data are grouped based on the geometric relationship from the plurality of viewpoints to observe the target object. Since appropriate association is performed for the target object that can take various positions/orientations, it is possible to accurately estimate the position/orientation of the target object.

Third Embodiment

<Outline>

In this embodiment, an example in which a target object is captured by one image capturing apparatus will be described. In this embodiment, for model edges in design data and image edges detected from an image, almost parallel image edges detected in the vicinity are grouped. Then, for the model edges and the image edges, ordering is performed based on the arrangement relationship between the edges of the groups on a two-dimensional image. The orders of the model edges and the image edges are compared for the groups, and a combination in which these match is selected.

As described above, since appropriate association is performed even if a plurality of similar combinations exist, it is possible to accurately estimate the position/orientation of the target object.

<Arrangement>

The arrangement of an information processing apparatus 200 according to this embodiment is the same as in the first embodiment, and a description thereof will be omitted. Note that one image capturing unit 101 is used in this embodiment, although two image capturing units 101 are provided in the first embodiment. A captured image processing unit 201 receives a captured image 10 from the image capturing unit 101, and a captured image 11 is not input. Parallelization of captured images is not performed.

<Processing>

Processing according to this embodiment is the same as in the second embodiment. However, some processes are different, and the differences will mainly be described.

(Step S1120)

In step S1120 of FIG. 8B, an edge positional relationship determination unit 204 assigns model edge positional relationship labels to model edges in the same model edge group. In this embodiment, the model edge positional relationship labels are assigned not based on the distance from a viewpoint but based on the position on an image plane, unlike the second embodiment. Details will be described below with reference to FIG. 10A.

Figure 10A:
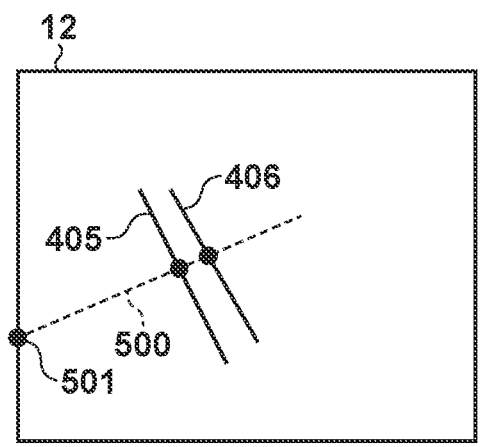
FIGS. 10A and 10B are views showing an example of processing performed by an edge position relationship determination unit 204 according to the third embodiment.

FIG. 10A shows two model edges 405 and 406 observed in a virtual image 12 on which a three-dimensional model 303 is projected from the viewpoint set in step S1100. These model edges form a single model edge group, and have the same model edge group ID. The edge positional relationship determination unit 204 selects one model edge from them. In FIG. 10A, the model edge 405 is selected. Next, the edge positional relationship determination unit 204 calculates a perpendicular 500 passing though the center (the middle point between the two ends of the edge) of the selected model edge 405, and an intersection 501 between the perpendicular 500 and the virtual image 12. On the intersection 501, coordinates in which x=0 or y=0 in the virtual image 12 are set.

Next, for the model edges 405 and 406, the edge positional relationship determination unit 204 calculates the distance from the intersection 501 to each model edge and sorts distances in ascending order. The edge positional relationship determination unit 204 assigns a model edge positional relationship label to each model edge in the same model edge group based on the sort result. In this embodiment, the model edge positional relationship label is assigned in the order of the sort result. That is, in the example shown in FIG. 10A, "1" is assigned as the model edge positional relationship label to the model edge 405 with the shortest distance from the intersection 501. Then, "2" is assigned as the model edge positional relationship label to the model edge 406 with the second shortest distance. The edge positional relationship determination unit 204 repetitively performs this processing for each model edge group.

The edge positional relationship determination unit 204 writes, in a model edge list 40, the model edge positional relationship labels obtained by the above-described processing.

(Step S1030)

In step S1030 of FIG. 8A, the edge positional relationship determination unit 204 determines the relative positional relationship between image edges that form the same image edge group ID and performs labeling. Unlike the above-described embodiment, the edge positional relationship determination unit 204 performs the determination of the relative positional relationship and the labeling based on the distances on the image plane using only the captured image 10. Details will be described with reference to FIG. 10B.

The edge positional relationship determination unit 204 extracts the list of image edge IDs that are the same image edge group ID from an image edge list 50 corresponding to the captured image 10. In the example shown in FIG. 10B, two image edges 415 and 416 are assigned as the image edges belonging to the same image edge group.

The edge positional relationship determination unit 204 selects one of the image edges belonging to the same image edge group. In the example shown in FIG. 10B, the image edge 415 is selected. Next, the edge positional relationship determination unit 204 calculates a perpendicular 510 passing though the center coordinates of the selected image edge 415, and an intersection 511 between the perpendicular 510 and the captured image 10. At this time, coordinates in which x=0 or y=0 in the captured image 10 are set as the intersection 511. The edge positional relationship determination unit 204 ensures consistency with the intersection 501 calculated in step S1120. That is, if the intersection 501 is a point with x=0 in the virtual image 12, the corresponding intersection 511 is also calculated as a point with x=0 in the captured image 10.

Next, for the image edges 415 and 416, the edge positional relationship determination unit 204 calculates the distance from the intersection 511 to each image edge and sorts distances in ascending order. The edge positional relationship determination unit 204 assigns an image edge positional relationship label to each image edge in the same image edge group based on the sort result. In this embodiment, the image edge positional relationship label is assigned in the order of the sort result. That is, in the example shown in FIG. 10B, "1" is assigned as the image edge positional relationship label to the image edge 415 with the shortest distance from the intersection 511. Then, "2" is assigned as the image edge positional relationship label to the image edge 416 with the second shortest distance. With this processing, the image edges are rearranged based on the arrangement relationship in the captured image 10.

The edge positional relationship determination unit 204 writes, in the image edge list 50, the positional relationship labels obtained by the above-described processing.

(Step S1040)

In step S1040, the edge correspondence selection unit 206 performs the same processing as the processing described in the first embodiment.

However, the edge correspondence selection unit 206 compares a model edge position label and an image edge position label, which are set based on the two-dimensional distance from a specific point set in the image, with each other, and associates only the edges that match. Accordingly, even in a case in which the distance on the image is short, if the positional relationship between the image edges on the image plane does not match the positional relationship between the model edges on the image plane, wrong association can be prevented.

Figure 10B:
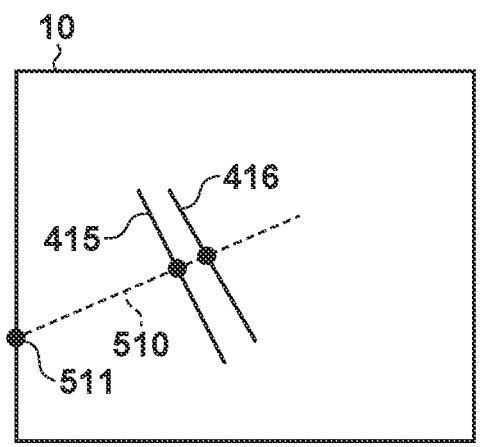

Note that in steps S1120 and S1030 according to this embodiment, the edge positional relationship determination unit 204 may set the intersections 501 and 511 at points different from those in the examples shown in FIGS. 10A and 10B. For example, one middle point of a model edge or an image edge may be set as the intersection 501 or 511. In this case, when calculating the distance from the intersection 501 to each model edge and the distance from the intersection 511 to each image edge, the edge positional relationship determination unit 204 assigns a positional relationship label in consideration of not only the value of the distance but also the direction at the same time. In this case, the edge positional relationship determination unit 204 calculates signed distances from the intersections 501 and 511 to the edges and sorts.

As described above, according to this embodiment, wrong association can be prevented using two-dimensional information for a plurality of edges in the vicinity. It is therefore possible to accurately estimate the position/orientation of the target object.

Fourth Embodiment

<Outline>

In this embodiment, for model edges in design data and image edges detected from an image, almost parallel image edges detected in the vicinity are grouped. Then, for the model edges and the image edges, ordering is performed based on the arrangement relationship between the edges of the groups on a two-dimensional image. For two images obtained from two image capturing apparatuses, the orders of the model edges and the image edges are compared for the groups, and a combination in which these match is selected. When matching is determined in both of the two images of different viewpoints, association is performed based on both the information of a two-dimensional positional relationship on an image plane and the information of a three-dimensional positional relationship including depth information. For this reason, more appropriate association is performed even if a plurality of candidates exist, and it is possible to accurately estimate the position/orientation of a target object.

<Arrangement>

The arrangement of an information processing apparatus 200 according to this embodiment is the same as in the second embodiment, and a description thereof will be omitted. In this embodiment, two image capturing units 101 are provided, as in the first embodiment. A captured image processing unit 201 receives captured images 10 and 11.

<Processing>

Processing according to this embodiment is the same as in the second embodiment. However, some processes are different, and the differences will mainly be described.

(Step S1015)

In step S1015, the captured image processing unit 201 estimates the approximate position/orientation of a target object 301 in each of the captured images 10 and 11. In this embodiment, after the approximate position/orientation in the captured image 10 is estimated, the approximate position/orientation in the captured image 11 is calculated using the calibrated external parameters of the captured images 10 and 11. That is, in this embodiment, two approximate positions/orientations corresponding to the captured images 10 and 11 are obtained by the processing of step S1015.

(Step S1030)

In step S1030, an edge positional relationship determination unit 204 determines the relative positional relationship between image edges that form the same image edge group ID based on the distance on the image plane, and performs labeling. This processing is the same as the processing described in the second embodiment. In this embodiment, however, the processing is performed for the two captured images 10 and 11, unlike the second embodiment in which only one captured image 10 is used. In this embodiment, an image edge list 50 is generated for each of the captured images 10 and 11. That is, two image edge lists 50 are generated, as in the first embodiment.

(Step S1040)

In step S1040, an edge correspondence selection unit 206 refers to the image edge list 50 updated by the edge positional relationship determination unit 204 and a viewpoint specific model edge list 45 held by a model edge positional relationship holding unit 205. By the reference, for two image edges detected from the captured images 10 and 11, a model edge positional relationship label and an image edge positional relationship label are collated. In this embodiment, two viewpoint specific model edge lists 45 and two image edge lists 50 exist in correspondence with the captured images 10 and 11. The edge correspondence selection unit 206 collates the model edge positional relationship label and the image edge positional relationship label for each of them.

When matching between the model edge positional relationship label and the image edge positional relationship label is satisfied in both captured images for the same model edge ID, the edge correspondence selection unit 206 associates the model edge and the image edge. That is, matching of the positional relationship is collated in each of the image edges obtained from the two captured images 10 and 11 for one model edge. Association is thus performed based on both the information of the two-dimensional positional relationship on the image plane and the information of the three-dimensional positional relationship including depth information.

As described above, according to this embodiment, both two-dimensional information and three-dimensional information are used for a plurality of edges in the vicinity using a plurality of images obtained from the image capturing units. Accordingly, wrong association can be prevented better. It is therefore possible to more accurately estimate the position/orientation of the target object.

[Modification 9]

In step S1030, when the edge positional relationship determination unit 204 performs labeling, not only the distance on the image plane but also the difference of the coordinates of image edges detected from the two images may further be used, as described in the first embodiment. Accordingly, more correct association is performed by using both the two-dimensional information and the three-dimensional information.

Fifth Embodiment

<Outline>

In this embodiment, a user operates an instruction input unit, thereby selecting a plurality of edges. An information processing apparatus groups a plurality of almost parallel edges included in a region based on the selection of the user.

<Arrangement>

FIG. 11 is a block diagram showing the overall arrangement of an information processing apparatus 200 according to this embodiment. In the information processing apparatus 200 according to this embodiment, an operation input unit 102 connected to the information processing apparatus is added in addition to the arrangement shown in FIG. 7 referred to in the second embodiment. The differences from the second embodiment will mainly be described below, and a description of the same parts will be omitted.

The operation input unit 102 is used while being connected to the information processing apparatus 200 and accepts an input of an instruction operation from the user. The information of the contents of the input instruction operation is sent to an edge group extraction unit 203 and a model edge positional relationship holding unit 205.

The edge group extraction unit 203 groups model edges and image edges by assigning the same edge group ID based on the instruction operation from the user input from the operation input unit 102, thereby generating edge groups.

<Processing>

Processing according to this embodiment is the same as in the second embodiment. However, some processes are different, and the differences will mainly be described.

(Step S1020)

In step S1020, the edge group extraction unit 203 groups image edges detected in step S1010 based on an instruction operation from the user, and assigns an image edge group ID. The procedure of assigning the image edge group ID will be described here with reference to FIG. 12.

Figure 12:
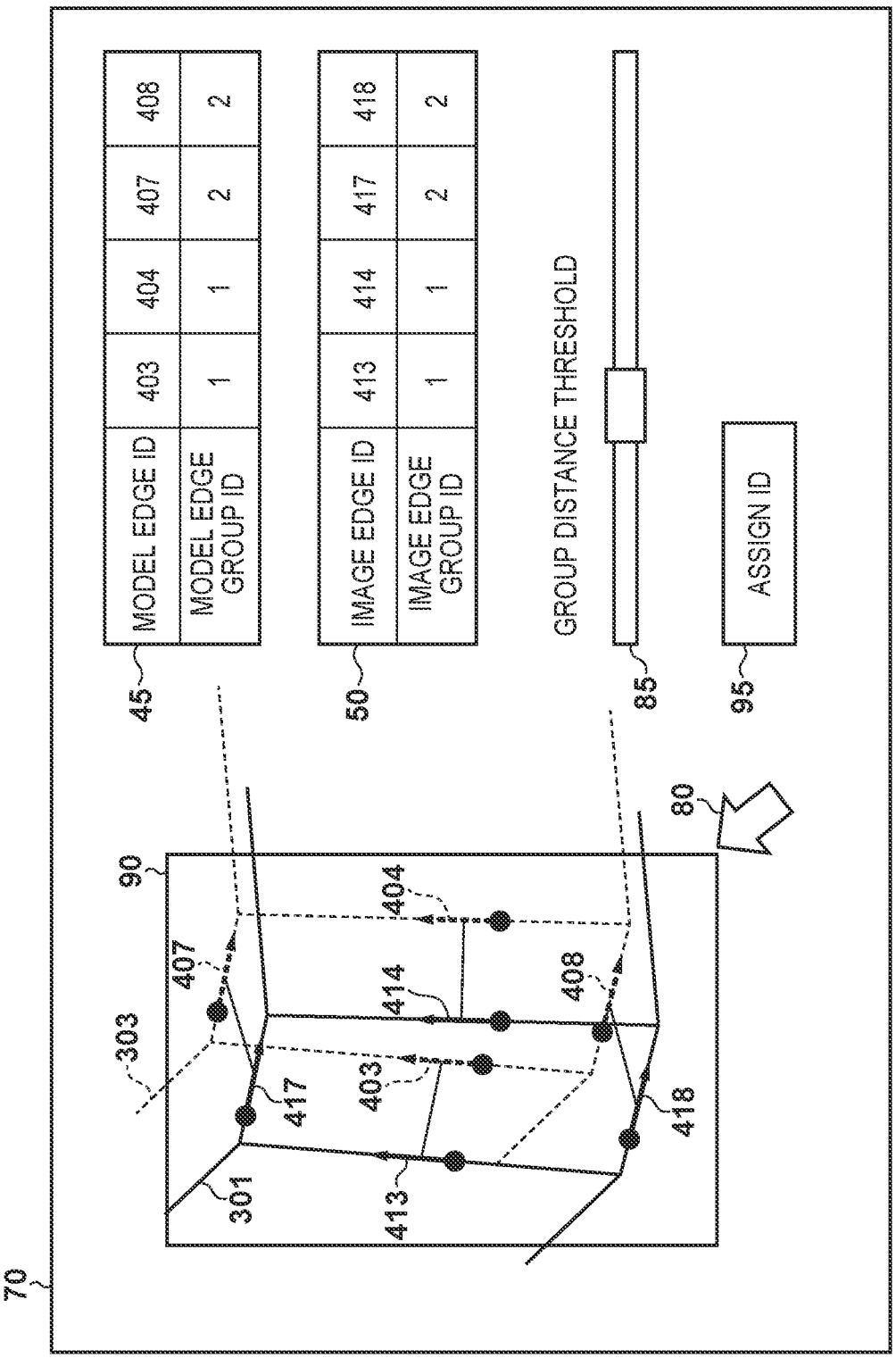
FIG. 12 is a view showing an example of an operation window 70 according to the fifth embodiment.

FIG. 12 shows an example of an operation window 70 according to this embodiment. In the operation window 70, an image in which a three-dimensional model 303 is drawn in an approximate position/orientation obtained in step S1015 is displayed while being superimposed on the image of a target object 301 included in a captured image 10. The user inputs an instruction to the operation input unit 102 while referring to the operation window 70, and sets a rectangular region 90 by moving a cursor 80. A viewpoint specific model edge list 45 and an image edge list 50 are partially displayed in the operation window 70, and the user can refer to the group ID assigned to each edge. In addition, a state in which a model edge and an image edge associated by an edge correspondence selection unit 206 are connected by a straight line is drawn. This allows the user to confirm the correspondence relationship of the two edges at the current time.

By moving a slider 85, the user can change a threshold used to determine the same cluster by the edge group extraction unit 203 and adjust the image edges belonging to the same image edge group.

When the user presses an ID assigning button 95, the edge group extraction unit 203 assigns an image edge group ID to each image edge included in the set rectangular region 90. At this time, the edge group extraction unit 203 assigns the same image edge group ID to a combination of almost parallel edges. In the example shown in FIG. 12, the edge group extraction unit 203 assigns "1" as the image edge group ID to image edges 413 and 414, and assigns "2" as the image edge group ID to image edges 417 and 418.

The edge group extraction unit 203 assigns a model edge group ID to each model edge based on an instruction from the user. The model edge group ID is assigned already in step S1110 to each viewpoint set in step S1100. Hence, when the user presses the ID assigning button 95, the edge group extraction unit 203 sets the already set model edge group ID again based on the rectangular region 90 only for the element of a viewpoint ID corresponding to an approximate position/orientation.

Like the image edge group ID, the same model edge group ID is assigned to a combination of almost parallel model edges in the model edges existing in the rectangular region 90. In the example shown in FIG. 12, the edge group extraction unit 203 assigns "1" as the model edge group ID to model edges 403 and 404, and assigns "2" as the model edge group ID to model edges 407 and 408.

As described above, according to this embodiment, the user selects a plurality of edges using the instruction input unit. Almost parallel edges in the vicinity are thus appropriately grouped, and more appropriate association is performed. It is therefore possible to accurately estimate the position/orientation of the target object.

[Modification 10]

The edge group extraction unit 203 may automatically assign the image edge group ID by the processing described concerning step S1020, and in a case in which the user does not perform the operation, may use the already assigned image edge group ID. The user need not perform the operation for all image edges, and the operation may be accepted only when changing the automatically assigned image edge group ID. This can reduce the work of the user.

[Modification 11]

In step S1110, the edge group extraction unit 203 may accept the input of the operation instruction from the user and assign a model edge group ID to each viewpoint.

[Modification 12]

The edge group extraction unit 203 may present the edges to the user by a display method that changes for each image edge group ID or model edge group ID in step S1110. For example, when image edges belonging to the same image edge group ID are displayed in the same color, the user can easily confirm the correspondence relationship of the edges.

Sixth Embodiment

<Outline>

In this embodiment, an example in which a grip portion such as a robot grips a target object using the estimation result of the three-dimensional position/orientation of the target object will be described.

<Arrangement>

In this embodiment, a driving unit configured to drive a grip portion (not shown) is provided outside an information processing apparatus 200, and a final target position/orientation for the grip portion is calculated based on the position/orientation of a target object 301 estimated by an collation unit 207. The final target position/orientation is a position/orientation at which an end effector (not shown) provided on the grip portion can grip the target object 301.

The final target position/orientation is calculated by applying predetermined three-dimensional transformation to the position/orientation estimated by the collation unit 207. The predetermined three-dimensional transformation is defined based on the relationship between the shape of the target object 301 and the end effector, and represents, on the coordinate system of the target object 301, the position/orientation of the driving unit most suitable for the end effector to grip the target object 301. The predetermined three-dimensional transformation is calculated in advance before the start of processing according to this embodiment and input as a parameter to the information processing apparatus 200 at the start of the processing.

As described above, according to this embodiment, the driving unit such as a robot can grip the target object using the estimation result of the three-dimensional position/orientation of the target object.

<Effects of Embodiments>

According to the first embodiment, using the design data of a target object, as for model edges in the design data and image edges detected from an image, almost parallel edges detected in the vicinity are grouped. Grouping of the model edges is performed based on an instruction from the user. Ordering is performed for the model edges and the image edges based on the three-dimensional geometric relationship of the edges in the groups. The orders of the model edges and the image edges are compared in the groups, and a combination in which these match is selected. Accordingly, since correct association is performed using three-dimensional information even if a plurality of similar combinations exist, it is possible to accurately estimate the position/orientation of the target object.

According to the second embodiment, using the design data of a target object, as for model edges in the design data and image edges detected from an image, almost parallel edges detected in the vicinity are grouped. For the model edges and the image edges, ordering is performed based on the three-dimensional geometric relationship between the edges in the groups. The orders of the model edges and the image edges are compared for the groups, and a combination in which these match is selected. Accordingly, since correct association is performed using three-dimensional information even if a plurality of similar combinations exist, it is possible to accurately estimate the position/orientation of the target object.

According to the third embodiment, using the design data of a target object, as for model edges in the design data and image edges detected from an image, almost parallel edges detected in the vicinity are grouped. For the model edges and the image edges, ordering is performed based on the arrangement relationship between the edges of the groups on a two-dimensional image. The orders of the model edges and the image edges are compared for the groups, and a combination in which these match is selected. Accordingly, since correct association is performed even if a plurality of similar combinations exist, it is possible to accurately estimate the position/orientation of the target object.

According to the fourth embodiment, using the design data of a target object, as for model edges in the design data and image edges detected from an image, almost parallel edges detected in the vicinity are grouped. For the model edges and the image edges, ordering is performed based on the arrangement relationship between the edges of the groups on a two-dimensional image. For two images obtained from two image capturing apparatuses, the orders of the model edges and the image edges are compared for the groups, and a combination in which these match is selected. When matching is determined in both of the two images of different viewpoints, association is performed based on both the information of a two-dimensional positional relationship on an image plane and the information of a three-dimensional positional relationship including depth information. For this reason, correct association is performed even if a plurality of candidates exist, and it is possible to accurately estimate the position/orientation of the target object.

According to the fifth embodiment, by an operation input from a user, a plurality of almost parallel edges that are locally detected are grouped. Since correct association is performed even if a plurality of candidates exist, and it is possible to accurately estimate the position/orientation of a target object.

According to the sixth embodiment, a driving unit such as a robot can grip a target object using the estimation result of the three-dimensional position/orientation of the target object.

Definitions

The captured image processing unit can be any unit as long as it can input an image captured by the image capturing unit into the apparatus. The image to be input can also be an image of any type such as an RGB color image, a grayscale image, or a monochrome image.

The three-dimensional model can have any form and any data structure as long as vertices and ridgelines (edges) in a three-dimensional space are defined.

The edge group extraction unit groups, of image edges detected from a captured image, image edges which have close positions and directions in a two-dimensional image and for which wrong association is performed at a high possibility. As the method, various methods are usable. In the first embodiment, an arrangement that causes the user to perform grouping in advance has been described. In the second embodiment, an arrangement that causes the edge group extraction unit to automatically perform determination and grouping has been described. In the fifth embodiment, an arrangement that performs grouping based on an operation of the user has been described.

The edge positional relationship determination unit defines the orders of model edges and image edges belonging to the same group based on the positional relationship. As the method, various methods are usable. In the first and second embodiments, a method of defining the order of the image edges based on the three-dimensional positional relationship has been described. In the third embodiment, a method of defining the order of the image edges based on the two-dimensional positional relationship has been described. In the Modification 9, a method using both the two-dimensional positional relationship and the three-dimensional positional relationship has been described.

The edge correspondence selection unit collates the matching of the orders based on the positional relationship of the image edges and the model edges and selects a corresponding combination. As the method, various methods are usable. In the first embodiment, a method of performing collation based on whether the labels assigned based on the positional relationship to the model edges and the image edges belonging to the same group match has been described. A method of performing processing in ascending order of the distance from an image edge and a viewpoint, thereby performing collation without assigning labels has also been described.

The collation unit collates the target object 301 with the captured image 10. Various methods are applicable to the collation, and the present invention is not limited to a method of specifically calculating the position/orientation of the target object 301. In Modification 3, an arrangement that collates whether the position/orientation of the target object that is input in advance almost matches the calculated position/orientation, and outputs the result has been described. In Modification 4, an arrangement that determines whether to normally end position/orientation calculation, and checks the existence of the target object 301 has been described.

According to the present invention, it is possible to accurately estimate the position/orientation of a target object even in a case in which a plurality of similar edges are locally detected from an image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-107154, filed Jun. 4, 2018, which is hereby incorporated by reference wherein in its entirety.

What is claimed is:

1. An information processing apparatus comprising:
one or more processors programmed to cause the information processing apparatus to function as:
an extraction unit configured to extract, as an image edge group, image edges whose positions are in a vicinity for each other, which are detected from a captured image obtained by capturing a target object;
a determination unit configured to determine an order that is based on coordinate positions in the captured image, between the image edges included in the image edge group;
a selection unit configured to select a combination of an image edge and a model edge, which correspond to each other, based on matching between the order of the image edges and an order held by a holding unit, between model edges that constitute a three-dimensional model of the target object, wherein the order is based on coordinate positions; and
an estimation unit configured to estimate a position/orientation of the target object by associating the model edge of the three-dimensional model with the image edge in the combination,
wherein the determination unit determines depth information based on differences of coordinates on the image edges detected from a plurality of captured images of different viewpoints, and orders the image edges in the image edge group based on the depth information.

2. The apparatus according to claim 1, wherein the selection unit selects the combination of the image edge and the model edge, which correspond to each other, based on the matching between the order of the image edges and the order of the model edges corresponding to a matching viewpoint as a viewpoint of the captured image.

3. The apparatus according to claim 1, wherein the determination unit orders the image edges in the image edge group based on positions of the image edges included in the image edge group, and
the selection unit selects the combination such that an order of the image edges and the order of the model edges match.

4. The apparatus according to claim 3, wherein the determination unit orders the image edges in the image edge group based on depth information of each image edge.

5. The apparatus according to claim 3, wherein the determination unit orders the image edges based on an arrangement order of the image edges in a direction crossing the image edges.

6. The apparatus according to claim 5, wherein the crossing direction is a direction almost vertical to the image edges.

7. The apparatus according to claim 1, wherein the one or more processors are programmed to further cause the information processing apparatus to function as:
an operation input unit configured to accept an input of an operation instruction from a user, and
wherein the extraction unit extracts the image edges in the vicinity as the image edge group based on the operation instruction.

8. The apparatus according to claim 1, wherein based on the estimated position/orientation of the target object, the estimation unit calculates a position/orientation at which a grip portion configured to grip the target object can grip the target object.

9. An information processing apparatus comprising:
one or more processors programmed to cause the information processing apparatus to function as:
an extraction unit configured to extract, as an image edge group, a plurality of image edges whose positions are in a vicinity for each other, which are detected from a captured image obtained by capturing a target object;
a determination unit configured to determine an order that is based on coordinate positions in the captured image, between the image edges included in the image edge group;
a selection unit configured to select a combination of an image edge and a model edge, which correspond to each other, based on matching between the order of the image edges and an order held by a holding unit between model edges that constitute a three-dimensional model of the target object, wherein the order is based on coordinate positions; and
an estimation unit configured to estimate a position/orientation of the target object by associating the model edge of the three-dimensional model with the image edge in the combination,
wherein the determination unit orders the image edges in the image edge group based on positions of the image edges included in the image edge group,
wherein the selection unit selects the combination such that an order of the image edges and the order of the model edges match, and
wherein the determination unit orders the image edges based on depth information of each image edge and an arrangement order of the image edges in a direction crossing the image edges.

10. An information processing apparatus comprising:
one or more processors programmed to cause the information processing apparatus to function as:
an extraction unit configured to extract, as an image edge group, image edges whose positions are in a vicinity for each other, which are detected from a first captured image and a second captured image obtained by capturing a target object, whose viewpoints are different;
a determination unit configured to order the image edges in the image edge group based on positions of the image edges included in the image edge group for each of the first captured image and the second captured image;
a holding unit configured to hold a positional relationship between model edges that constitute a three-dimensional model of the target object;
a selection unit configured to select a combination of an image edge and a model edge, which correspond to each other, such that an order of the image edges and an order of the model edges in the first captured image match, and an order of the image edges and an order of the model edges in the second captured image match; and
an estimation unit configured to estimate a position/orientation of the target object by associating the model edge of the three-dimensional model with the image edge in the combination.

11. A method of controlling an information processing apparatus, the method comprising:
extracting, as an image edge group, image edges whose positions are in a vicinity for each other, which are detected from a captured image obtained by capturing a target object;
determining an order that is based on coordinate positions in the captured image, between the image edges included in the image edge group;
selecting a combination of an image edge and a model edge, which correspond to each other, based on matching between the order of the image edges and an order held by a holding unit, between model edges that constitute a three-dimensional model of the target object, wherein the order is based on coordinate positions; and
estimating a position/orientation of the target object by associating the model edge of the three-dimensional model with the image edge in the combination,
wherein depth information is determined based on differences of coordinates on the image edges detected from a plurality of captured images of different viewpoints, and the image edges in the image edge group are ordered based on the depth information.

12. The method according to claim 11, wherein in the selecting, the combination of the image edge and the model edge, which correspond to each other, is selected based on the matching between the order of the image edges and the order of the model edges corresponding to a matching viewpoint as a viewpoint of the captured image.

13. The method according to claim 11, wherein in the determining, the image edges in the image edge group are ordered based on positions of the image edges included in the image edge group, and
in the selecting, the combination is selected such that the order of the image edges and the order of the model edges match.

14. The method according to claim 13, wherein in the determining, the image edges in the image edge group are ordered based on depth information of each image edge.

15. The method according to claim 13, wherein in the determining, the image edges are ordered based on an arrangement order of the image edges in a direction crossing the image edges.

16. The method according to claim 15, wherein the crossing direction is a direction almost vertical to the image edges.

17. A method of controlling an information processing apparatus, the method comprising:
extracting, as an image edge group, image edges whose positions are in a vicinity for each other, which are detected from a captured image obtained by capturing a target object;
determining an order that is based on coordinate positions in the captured image, between the image edges included in the image edge group;
selecting a combination of an image edge and a model edge, which correspond to each other, based on matching between the order of the image edges and an order held by a holding unit, between model edges that constitute a three-dimensional model of the target object, wherein the order is based on coordinate positions; and
estimating a position/orientation of the target object by associating the model edge of the three-dimensional model with the image edge in the combination,
wherein in the determining, the image edges in the image edge group are ordered based on positions of the image edges included in the image edge group,
wherein, in the selecting, the combination is selected such that the order of the image edges and the order of the model edges match, and wherein in the determining, the image edges are ordered based on depth information of each image edge and an arrangement order of the image edges in a direction crossing the image edges.

18. A non-transitory computer-readable storage medium storing a computer program for causing a computer to execute a method of controlling an information processing apparatus, the method comprising:
- extracting, as an image edge group, image edges whose positions are in a vicinity for each other, which are detected from a captured image obtained by capturing a target object;
- determining an order that is based on coordinate positions in the captured image, between the image edges included in the image edge group;
- selecting a combination of an image edge and a model edge, which correspond to each other, based on matching between the order of the image edges and an order held by a holding unit, between model edges that constitute a three-dimensional model of the target object, wherein the order is based on coordinate positions; and
- estimating a position/orientation of the target object by associating the model edge of the three-dimensional model with the image edge in the combination,
- wherein depth information is determined based on differences of coordinates on the image edges detected from a plurality of captured images of different viewpoints, and the image edges in the image edge group are ordered based on the depth information.

* * * * *